(12) United States Patent
Yoo et al.

(10) Patent No.: US 12,056,377 B2
(45) Date of Patent: Aug. 6, 2024

(54) MEMORY STORAGE DEVICE AND ELECTRONIC DEVICE INCLUDING A NONVOLATILE MEMORY WITH CONFIGURABLE CAPACITY FOR PROVIDING HOST DATA

(71) Applicant: Samsung Electronics Co., Ltd., Suwon-si (KR)

(72) Inventors: Sun-Mi Yoo, Seoul (KR); Young-Sik Lee, Suwon-si (KR); Jeong-Eun Kim, Seongnam-si (KR); Hye Ju Kim, Seongnam-si (KR); So Dam Hwang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/937,068

(22) Filed: Sep. 30, 2022

(65) Prior Publication Data

US 2023/0195344 A1 Jun. 22, 2023

(30) Foreign Application Priority Data

Dec. 21, 2021 (KR) .................. 10-2021-0183267

(51) Int. Cl.
*G06F 3/06* (2006.01)
*G06F 12/02* (2006.01)

(52) U.S. Cl.
CPC ............ *G06F 3/064* (2013.01); *G06F 3/0607* (2013.01); *G06F 3/0658* (2013.01); *G06F 3/0679* (2013.01); *G06F 12/0253* (2013.01)

(58) Field of Classification Search
CPC ...... G06F 3/064; G06F 3/0607; G06F 3/0658; G06F 3/0679; G06F 12/0253; G06F 12/0238; G06F 12/0246; G06F 12/0261; G06F 2212/1016; G06F 2212/7201; G06F 2212/7205; G06F 2212/7207; G06F 2212/7208; G11C 16/06
See application file for complete search history.

(56) References Cited

U.S. PATENT DOCUMENTS

| 8,725,931 B1 | 5/2014 | Kang |
| 10,248,327 B2 | 4/2019 | Kryvaltsevich |
| 10,255,179 B2 | 4/2019 | Ji et al. |
| 10,613,975 B2 | 4/2020 | Jung et al. |

(Continued)

*Primary Examiner* — Michelle T Bechtold
*Assistant Examiner* — Tong B. Vo
(74) *Attorney, Agent, or Firm* — Myers Bigel, P.A.

(57) ABSTRACT

A memory storage device includes a non-volatile memory including a plurality of memory blocks and a memory controller configured to control the non-volatile memory, wherein the memory controller is configured to provide host data including write data to the non-volatile memory, wherein the memory controller is configured to perform a garbage collection operation on the memory blocks to provide garbage collection data to the non-volatile memory when a free block count of the memory blocks is smaller than a first threshold value, and wherein the memory controller is configured to increase a capacity for providing the host data when the free block count of the memory blocks is greater than a second threshold value less than the first threshold value and a valid page count of the first memory block among the memory blocks is less than a third threshold value.

20 Claims, 20 Drawing Sheets

(56) References Cited

U.S. PATENT DOCUMENTS

| | | | |
|---|---|---|---|
| 10,719,439 B2 | 7/2020 | Goss et al. | |
| 10,739,996 B1 | 8/2020 | Ebsen et al. | |
| 2017/0285945 A1* | 10/2017 | Kryvaltsevich | G06F 3/0679 |
| 2017/0351604 A1* | 12/2017 | Tang | G06F 3/0679 |
| 2020/0183851 A1* | 6/2020 | Um | G06F 12/0253 |
| 2020/0264985 A1* | 8/2020 | Lee | G06F 12/0246 |
| 2021/0157723 A1* | 5/2021 | Byun | G06F 12/0891 |
| 2021/0278990 A1* | 9/2021 | Choi | G06F 3/0608 |
| 2021/0365367 A1* | 11/2021 | Kim | G06F 3/064 |
| 2022/0342811 A1* | 10/2022 | Yang | G06F 12/0882 |
| 2023/0025761 A1* | 1/2023 | Yang | G06F 12/0253 |

\* cited by examiner

MEMORY STORAGE DEVICE AND ELECTRONIC DEVICE INCLUDING A NONVOLATILE MEMORY WITH CONFIGURABLE CAPACITY FOR PROVIDING HOST DATA

CROSS-REFERENCE TO RELATED APPLICATION

This application claims priority from Korean Patent Application No. 10-2021-0183267, filed on Dec. 21, 2021, in the Korean Intellectual Property Office, the disclosure of which is incorporated herein by reference in their entirety.

BACKGROUND

1. Technical Field

The present disclosure relates to a memory storage device and an electronic device including a non-volatile memory. In particular, the present disclosure relates to a memory storage device and an electronic device that are configured to perform garbage collection.

2. Description of the Related Art

Semiconductor memory devices include volatile memory devices and non-volatile memory devices. While the volatile memory devices may have generally high read and write speeds, the volatile memory devices may lose stored content when the power is turned off. In contrast, because non-volatile memory devices retain stored content even when the power is turned off, the non-volatile memory devices are used to store the content to be retained regardless of whether the power supply is supplied.

For example, volatile memory devices include a static RAM (SRAM), a dynamic RAM (DRAM), a synchronous DRAM (SDRAM), and the like. The non-volatile memory devices retain the stored content even when the power is turned off. For example, non-volatile memory devices include a ROM (read only memory), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RRAM), a ferroelectric RAM (FRAM), and the like. The flash memory may be classified as a NOR type flash memory or a NAND type flash memory.

In particular, the flash memory device may have an advantage in that it may be implemented as a highly integrated auxiliary large-capacity storage device as compared to a general EEPROM.

Various memory systems are produced using a flash memory. A memory system may store data in or read data from flash memory through a protocol.

A flash memory may perform a garbage collection operation to secure free blocks. An amount of data transferred from the host may change as the garbage collection operation is performed. It may be desirable to control the amount of data provided by the host to limit a reduction in the performance of the flash memory.

SUMMARY

Aspects of the present disclosure may provide an electronic device in which performance of a non-volatile memory is improved.

Aspects of the present disclosure may also provide a memory storage device in which the performance of the non-volatile memory is improved.

However, aspects of the present disclosure are not restricted to the ones set forth herein. The above and other aspects of the present disclosure will become more apparent to one of ordinary skill in the art to which the present disclosure pertains by referencing the detailed description of the present disclosure given below.

According to some aspects of the present disclosure, a memory storage device is provided comprising a non-volatile memory including a plurality of memory blocks and a memory controller configured to control the non-volatile memory, wherein the memory controller is configured to provide host data including write data to the non-volatile memory, wherein the memory controller is configured to perform a garbage collection operation on the memory blocks to provide garbage collection data to the non-volatile memory when a free block count of the memory blocks is less than a first threshold value, and wherein the memory controller is configured to increase a capacity for providing the host data when the free block count of the memory blocks is greater than a second threshold value less than the first threshold value and a valid page count of the first memory block among the memory blocks is less than a third threshold value.

According to some aspects of the present disclosure a memory storage device is provided comprising a non-volatile memory including a plurality of memory blocks and a memory controller including a memory interface connected to the non-volatile memory, wherein the memory controller is configured to provide host data including write data to the memory interface, wherein the memory controller is configured to provide garbage collection data to the memory interface when a free block count of the memory blocks is less than a first threshold value, wherein the memory interface is configured to provide one or both of the host data and the garbage collection data to the non-volatile memory, wherein the memory interface is configured not to control a ratio of a capacity for providing the host data to a capacity for providing the garbage collection data when a valid page count of a first memory block among the memory blocks is smaller than a third threshold value, and wherein the memory interface is configured to control the ratio of the capacity for providing the host data to the capacity for providing the garbage collection data when the valid page count of the first memory block among the memory blocks is equal to or greater than the third threshold value.

According to some aspects of the present disclosure, an electronic device is provided comprising a non-volatile memory including plurality of memory blocks a memory controller configured to control the non-volatile memory; and a host connected to the memory controller, wherein the host is configured to provide host data to the non-volatile memory, wherein the memory controller is configured to perform a garbage collection operation on the memory blocks to provide garbage collection data to the non-volatile memory when a free block count of the memory blocks is less than a first threshold value, and wherein the memory controller is configured to increase a capacity for providing the host data, and is configured to decrease a capacity for providing the garbage collection data when the free block count of the memory blocks is greater than a second threshold value less than the first threshold value, and a valid page count of the first memory block among the memory blocks is less than a third threshold value.

DETAILED DESCRIPTION OF THE EMBODIMENTS

Figure 1:
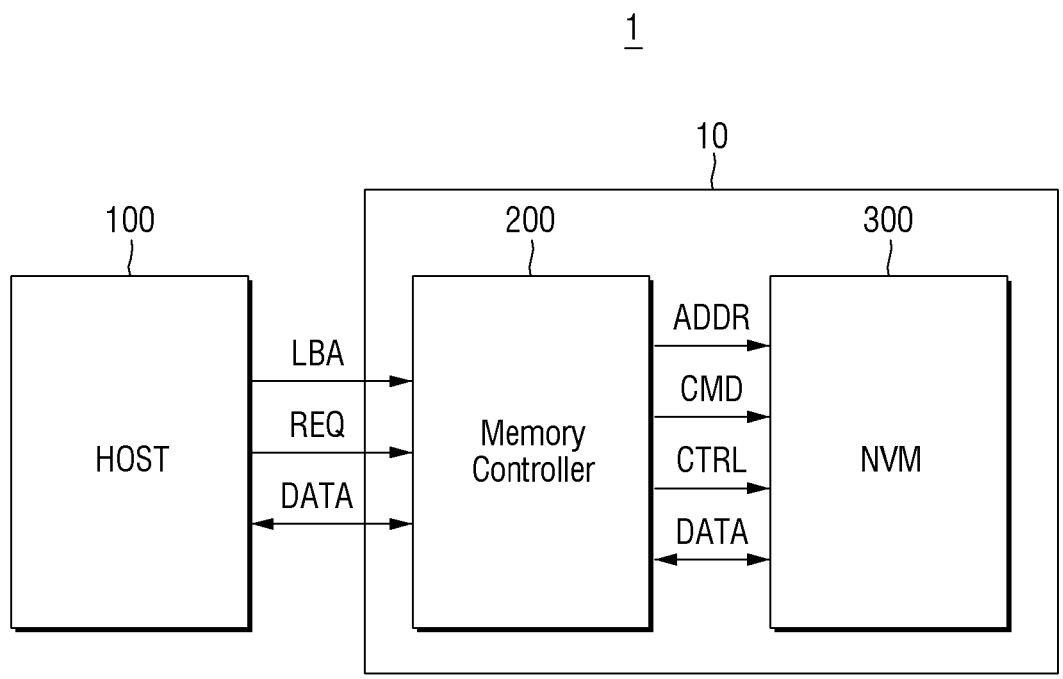
FIG. 1 is a block diagram that illustrates an electronic device according to some embodiments.

Hereinafter, embodiments according to the technical idea of the present disclosure will be described referring to the accompanying drawings. The present inventive subject matter may, however, be embodied in many different forms and should not be construed as limited to the embodiments set forth herein. In the drawings, like numerals refer to like elements throughout this application and repeated descriptions may be omitted. It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

Hereinafter, an electronic device 1 including a host 100, a memory controller 200, and a non-volatile memory 300 will be described referring to FIGS. 1 to 3.

FIG. 1 is a block diagram that illustrates an electronic device according to some embodiments. FIG. 2 is a block diagram that illustrates the memory controller of FIG. 1. FIG. 3 is a block diagram that illustrates the non-volatile memory of FIG. 1.

Referring to FIG. 1, the electronic device 1 may include the host 100 and a memory storage device 10. The host 100 and the memory storage device 10 may be electrically connected to each other. The host 100 may be configured to provide the memory storage device 10 with a logical block address LBA and a request signal REQ, and the host 100 and the memory storage device 10 may be configured to send and receive data DATA. For example, the host 100 may be connected to the memory controller 200.

The host 100 may include, for example, a PC (personal computer), a notebook (laptop), a mobile phone, a smart phone, a tablet PC, and the like.

The memory storage device 10 may include a memory controller 200 and a non-volatile memory 300. The memory storage device 10 may be integrated into a single, monolithic semiconductor device. For example, the memory storage device 10 may include an embedded UFS (Universal Flash Storage) memory device, an eMMC (embedded MultiMedia Card), an SSD (Solid State Drive), and the like. Further, for example, the memory storage device 10 may include an attachable and detachable UFS memory card, a CF (Compact Flash), an SD (Secure Digital), a Micro-SD (Micro Secure Digital), a Mini-SD (Mini Secure Digital), an xD (extreme Digital), a memory stick, and the like.

The non-volatile memory 300 may include a NAND flash memory. However, embodiments according to the technical idea of the present disclosure are not limited thereto, and the non-volatile memory 300 may include a NOR flash memory, or may include a resistive memory, such as a PRAM (Phase-change RAM), an MRAM (Magneto resistive RAM), a FeRAM (Ferroelectric RAM), and a RRAM (Resistive RAM).

The memory controller 200 may be connected to the non-volatile memory to control the non-volatile memory 300. For example, the memory controller 200 may be configured to provide an address ADDR, a command CMD, and a control signal CTRL or the like to the non-volatile memory 300 in response to a logical block address LBA, a request signal REQ, and the like received from the host 100. That is, the memory controller 200 may be configured to provide signals to the non-volatile memory 300 and to write data to the non-volatile memory 300 and/or to read data from the non-volatile memory 300. Further, the memory controller 200 and the non-volatile memory 300 may be configured to send and receive the data DATA. Here, data including the data DATA, which is provided from the host 100, may be referred to as host data.

Figure 2:
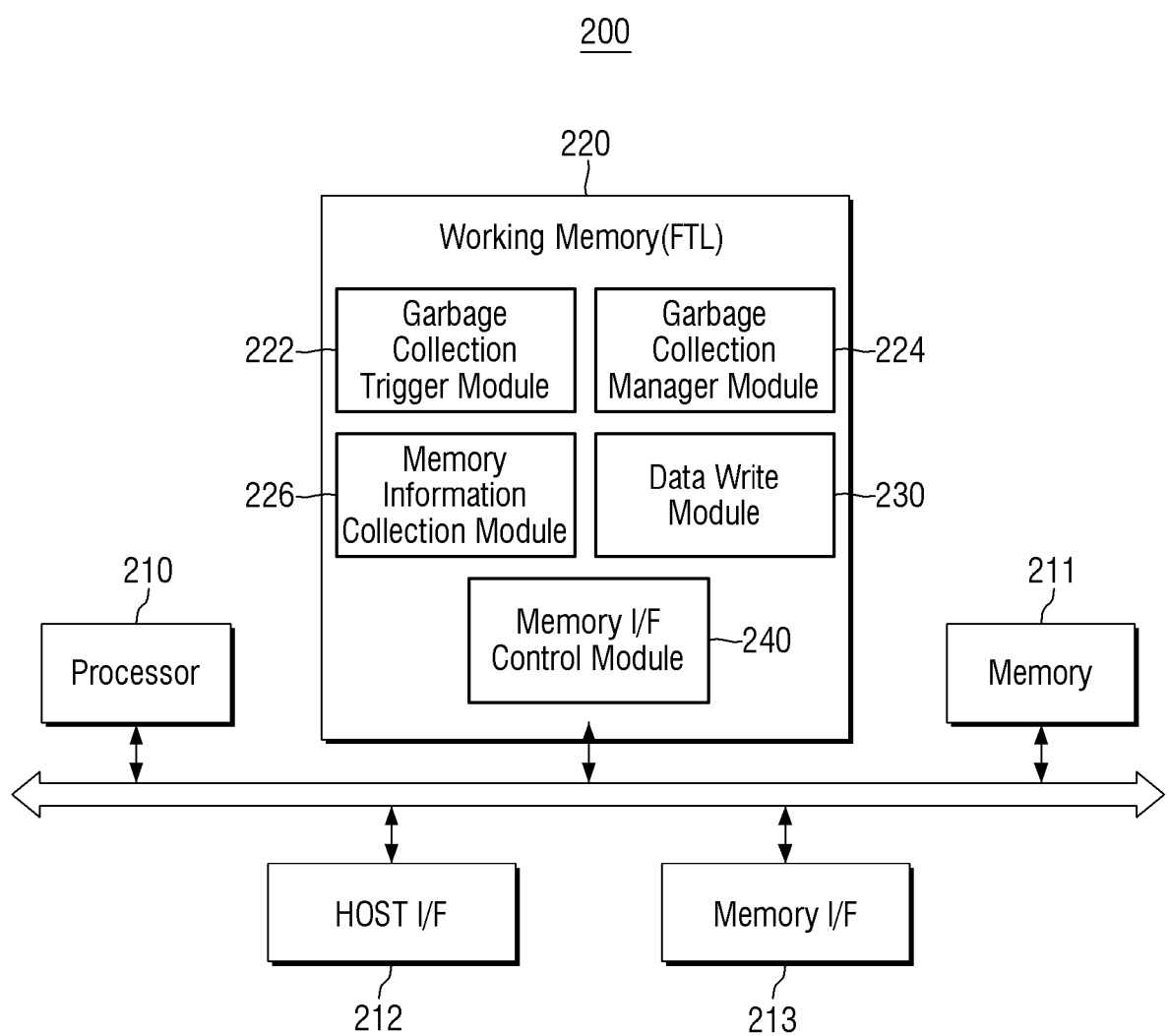
FIG. 2 is a block diagram that illustrates the memory controller of FIG. 1.

Referring to FIG. 2, the memory controller 200 may include a processor 210, a memory 211, a host interface 212, a memory interface 213, and a working memory 220.

The processor 210 may include a central processing unit (CPU), a controller (Controller), an application specific integrated circuit (ASIC), and the like. The processor 210 may be configured to control the overall operation of the memory controller 200. The processor 210 may be configured to control the memory controller 200 by executing the firmware loaded into the working memory 220.

The memory 211 may be configured to store code data used for initial booting of the memory storage device 10.

The memory controller 200 and the host 100 may be connected through the host interface 212. That is, the data DATA may be transferred and received through the host interface 212. The host interface 212 may include an Advanced Technology Attachment(ATA), a Serial ATA (SATA), an external SATA(e-SATA), a Universal serial bus(USB), and the like.

The memory controller 200 and the non-volatile memory 300 may be connected through the memory interface 213. That is, the data DATA, the control signal CTRL, the address ADDR, the command CMD, and the like may be transferred and received through the memory interface 213. The working memory 220 may be implemented as a cache memory, a DRAM, an SRAM, a flash memory, or the like.

The working memory 220 may include a flash translation layer (FTL). The flash translation layer may include system software that is configured to manage write, read, erase operations, and the like of the non-volatile memory 300. For example, the flash translation layer may include firmware. The flash translation layer may be loaded into the working memory 220. The processor 210 may be configured to execute the firmware of the flash translation layer.

The working memory 220 may include a garbage collection trigger module 222, a garbage collection manager module 224, a memory information collection module 226, a data write module 230, a memory interface control module 240, and the like.

The working memory 220 may be configured to convert the logical block address LBA into the address ADDR using the data write module 230 and to provide it to the non-volatile memory 300. The working memory 220 may be configured to manage the memory cells of the non-volatile memory 300. For example, the working memory 220 may be configured to perform garbage collection and bad block management operations on the blocks of the memory cell array 310 of the non-volatile memory 300.

The memory controller 200 may be configured to control the garbage collection operations of the non-volatile memory 300, using the garbage collection trigger module 222, the garbage collection manager module 224, and the like. For example, the garbage collection trigger module 222 may be configured to provide a garbage collection trigger signal to the garbage collection manager module 224 in response to a garbage collection request. For example, the garbage collection manager module 224 may be configured to control the garbage collection of the non-volatile memory 300, using meta data or the like.

Here, the garbage collection is for securing a free block in the non-volatile memory 300. Because the data unit for a write operation is a page and the data unit for an erase operation is a block, logic may be used for controlling these operations. Therefore, a free block may be secured by writing a valid page to another block through garbage collection and by erasing the block including the valid page. The garbage collection may improve the performance of the memory storage device 10.

The memory interface control module 240 may be configured to control the memory interface 213. For example, the memory interface control module 240 may be configured to control capacity of data transferred through the memory interface 213. That is, the memory interface control module 240 may be configured to control the capacity of data transferred by the memory interface 213 during the same time. This will be described in more detail below.

Figure 3:
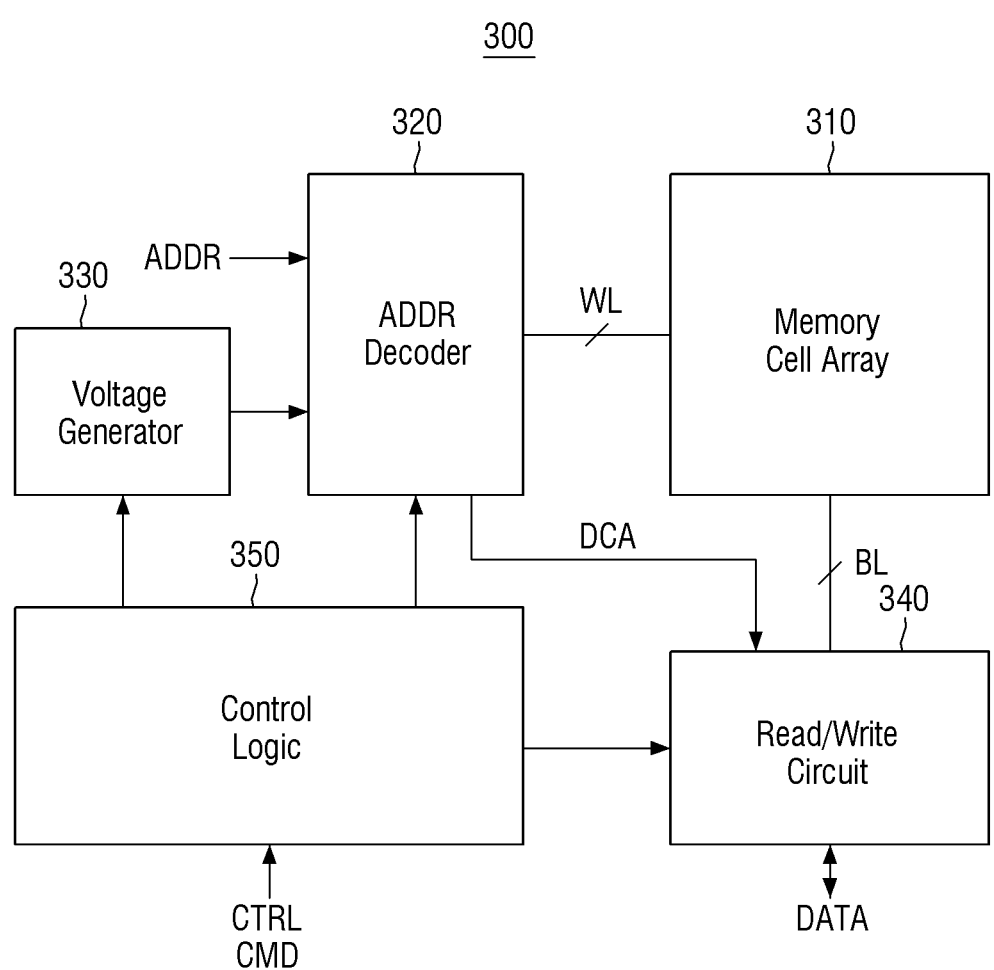
FIG. 3 is a block diagram that illustrates the non-volatile memory of FIG. 1.

Referring to FIG. 3, the non-volatile memory 300 may include a memory cell array 310, an address decoder 320, a voltage generator 330, a read/write circuit 340, a control logic 350, and the like.

The memory cell array 310 may be connected to the address decoder 320 through word lines WL. The memory cell array 310 may be connected to the read/write circuit 340 through bit lines BL. The memory cell array 310 may include a plurality of memory cells. For example, memory cells arranged in a row direction may be connected to the word line WL. For example, memory cells arranged in a column direction may be connected to the bit line BL.

The address decoder 320 may be connected to the memory cell array 310 through the word line WL. The address decoder 320 may operate in response to the control of the control logic 350. The address decoder 320 may receive the address ADDR from the memory controller 200. The address decoder 320 may receive a voltage used for operation, such as a program and a read from the voltage generator 330.

The address decoder 320 may be configured to decode a row address among the received addresses ADDR. The address decoder 320 may be configured to select the word line WL, using the decoded row address. The decoded column address DCA may be provided to the read/write circuit 340. For example, the address decoder 320 may include a row decoder, a column decoder, an address buffer, and the like.

The voltage generator 330 may be configured to generate the voltage used for the access operation according to the control of the control logic 350. For example, the voltage generator 330 may generate the program voltage and program verification voltage used to perform the program operation. For example, the voltage generator 330 may be configured to generate the read voltages used to perform the read operation, and may be configured to generate the erase voltage, the erase verification voltage, and the like used to perform the erase operation. Further, the voltage generator 330 may provide the address decoder 320 with the voltage used to perform each operation.

The read/write circuit 340 may be connected to the memory cell array 310 through the bit line BL. The read/write circuit 340 may be configured to send and receive the data DATA to and from the memory controller 200. The read/write circuit 340 may be configured to operate in response to the control of the control logic 350. The read/write circuit 340 may be configured to receive the decoded column address DCA from the address decoder 320. The read/write circuit 340 may be configured to select the bit line BL using the decoded column address DCA.

For example, the read/write circuit 340 may be configured to program the received data DATA in the memory cell array 310. The read/write circuit 340 may be configured to read data from the memory cell array 310 and to provide the read data to the outside (for example, the memory controller 200). For example, the read/write circuit 340 may include a configuration, such as a sense amplifier, a write driver, a column selection circuit, and a page buffer.

The control logic 350 may be connected to the address decoder 320, the voltage generator 330, and the read/write circuit 340. The control logic 350 may be configured to control the operation of the non-volatile memory 300. The control logic 350 may be configured to operate in response to a control signal CTRL and command CMD (e.g., write command, read command, etc.) provided from the memory controller 200. The control logic 350 may be configured to perform the garbage collection on the memory cell array 310 by the control of the memory controller 200.

Figure 4:
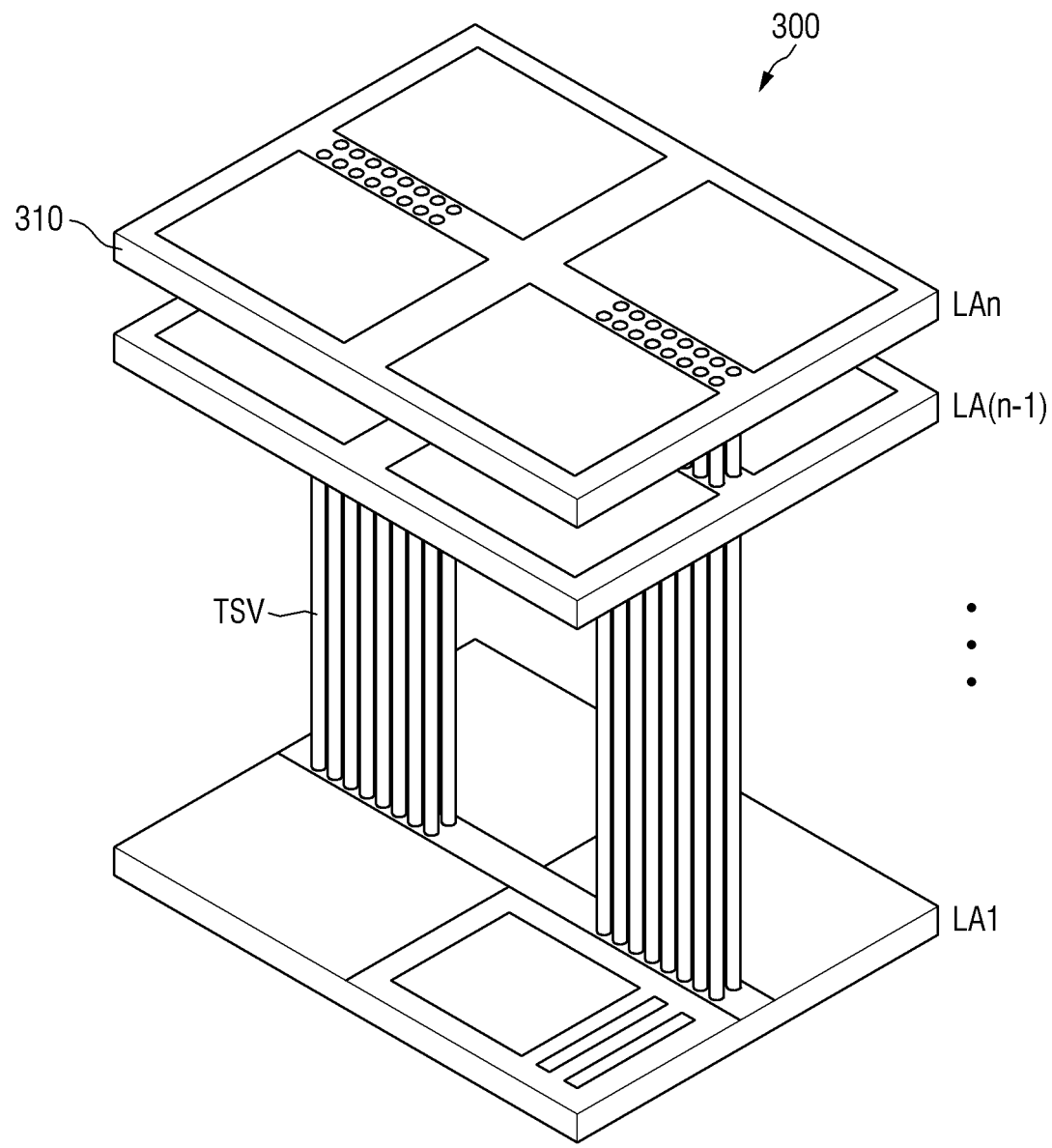
FIG. 4 is an example block diagram illustrating a non-volatile memory device according to some embodiments.

FIG. 4 is an example block diagram showing a non-volatile memory device according to some embodiments.

Referring to FIGS. 3 and 4, the non-volatile memory 300 according to some embodiments may include a plurality of semiconductor layers LA1 to LAn. Each of the plurality of semiconductor layers LA1 to LAn may be a memory chip, or a part of the plurality of semiconductor layers LA1 to LAn may be a master chip, which is configured to perform interfacing with an external device (for example, the host 100 of FIG. 1), and the rest may be slave chips that store data.

For example, an nth layer LAn and a first layer LA1 of the non-volatile memory 300 may be semiconductor chips including the memory cell array 310. Each of the plurality of semiconductor layers LA1 to LAn may be configured to transmit and receive signals through a through silicon via (TSV). The configuration and arrangement of the non-volatile memory 300 according to some embodiments are not limited thereto.

Figure 5:
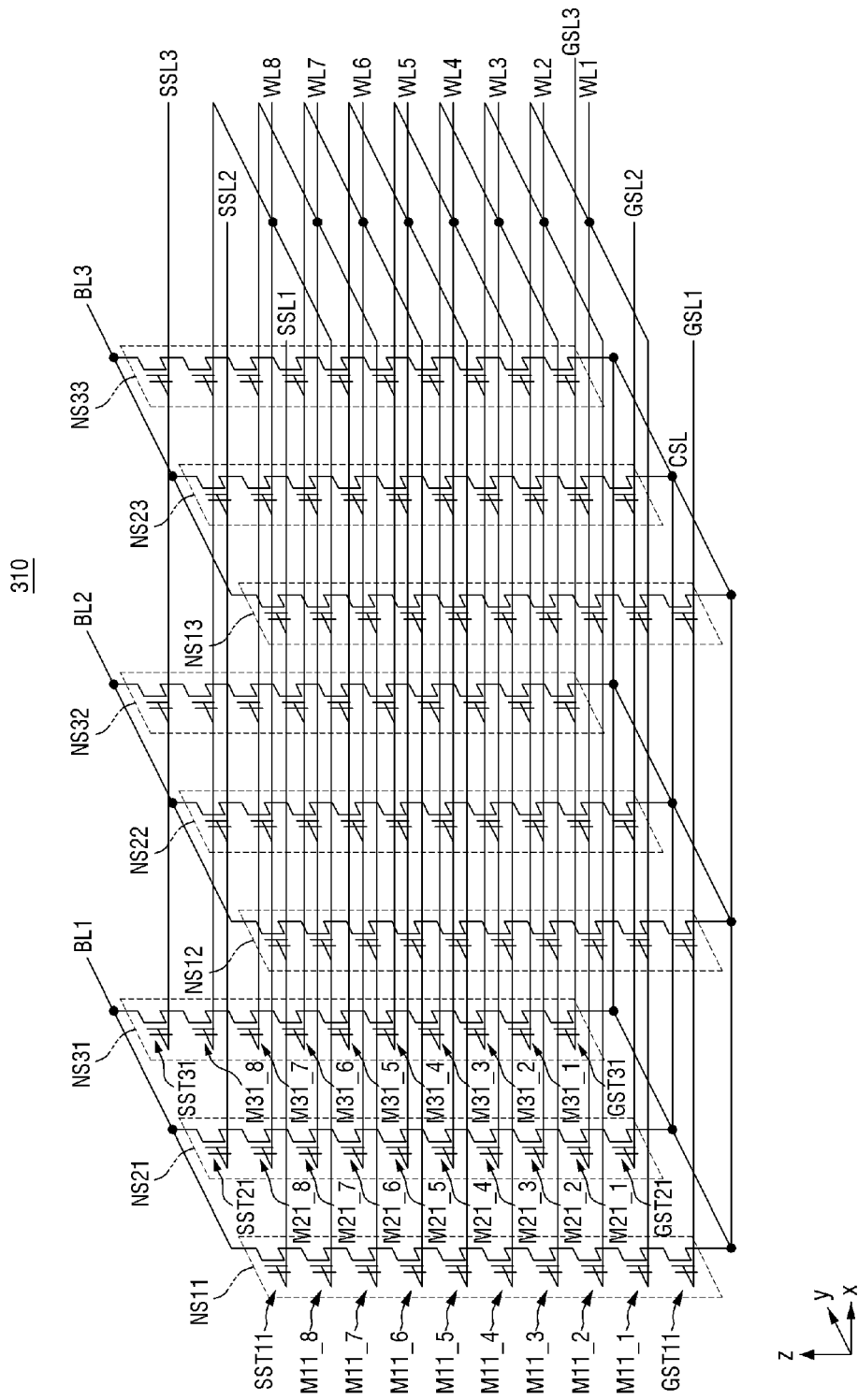
FIG. 5 is an example circuit diagram showing a memory cell array according to some embodiments.

FIG. 5 is an example circuit diagram illustrating a memory cell array according to some embodiments.

Referring to FIG. 5, a plurality of cell strings NS11, NS21, NS31, NS12, NS22, NS32, NS13, NS23, and NS33 may be placed on a substrate (not shown) and arranged in a first direction x and a second direction y. The plurality of cell strings NS11, NS21, NS31, NS12, NS22, NS32, NS13, NS23, and NS33 may have a form that extends in a third direction z. The plurality of cell strings NS11, NS21, NS31, NS12, NS22, NS32, NS13, NS23, and NS33 may be connected in common to a common source line CSL formed on a substrate (not shown) or inside a substrate (not shown). The common source line CSL is shown as being connected to lowermost ends of the plurality of cell strings NS11, NS21, NS31, NS12, NS22, NS32, NS13, NS23, and NS33 in the third direction z. However, the common source line CSL may be electrically connected to the lowermost ends of the plurality of cell strings NS11, NS21, NS31, NS12, NS22, NS32, NS13, NS23, and NS33 in the third direction z, and embodiments of the common source line CSL are not limited to a configuration physically located at the lower ends of the plurality of cell strings NS11, NS21, NS31, NS12, NS22, NS32, NS13, NS23, and NS33. Further, although FIG. 5 illustrates an embodiment in which the plurality of cell strings NS11, NS21, NS31, NS12, NS22, NS32, NS13, NS23, and NS33 are placed in a 3×3 arrangement, the placement form and the number of the plurality of cell strings placed in the memory cell array 310 are not limited thereto.

Some cell strings NS11, NS12, and NS13 may be connected to a first ground select line GSL1. Some cell strings NS21, NS22, and NS23 may be connected to a second ground select line GSL2. Some cell strings NS31, NS32, and NS33 may be connected to a third ground select line GSL3.

Further, some cell strings NS11, NS12, and NS13 may be connected to a first string select line SSL1. Some cell strings NS21, NS22, and NS23 may be connected to a second string select line SSL2. Some cell strings NS31, NS32, and NS33 may be connected to a third string select line SSL3.

Each of the plurality of cell strings NS11, NS21, NS31, NS12, NS22, NS32, NS13, NS23, and NS33 may include a string select transistor SST connected to each string select line. In addition, each of the plurality of cell strings NS11, NS21, NS31, NS12, NS22, NS32, NS13, NS23, and NS33 may include a ground select transistor (GST) connected to each ground select line.

One end of each of the ground select transistors of each of the plurality of cell strings NS11, NS21, NS31, NS12, NS22, NS32, NS13, NS23, and NS33 may be connected to the common source line CSL. Also, in each of the plurality of cell strings NS11, NS21, NS31, NS12, NS22, NS32, NS13, NS23, and NS33, a plurality of memory cells may be stacked sequentially in the third direction z, between the ground select transistor and the string select transistor. Although it is not shown in this drawing, each of the plurality of cell strings NS11, NS21, NS31, NS12, NS22, NS32, NS13, NS23, and NS33 may include dummy cells between the ground select transistor and the string select transistor. Further, the number of string select transistors included in each string is not limited to the example shown in FIG. 5.

For example, a cell string NS11 may include a ground select transistor GST11 placed at the lowermost end in the third direction z, a plurality of memory cells M11_1 to M11_8 stacked sequentially in the third direction z on the ground select transistor GST11, and a string select transistor SST11 stacked in the third direction z on the uppermost memory cell M11_8. Further, a cell string NS21 may include a ground select transistor GST21 placed at the lowermost end in the third direction z, a plurality of memory cells M21_1 to M21_8 stacked sequentially in the third direction z on the ground select transistor GST21, and a string select transistor SST21 stacked in the third direction z on the uppermost memory cell M21_8. Further, a cell string NS31 may include a ground select transistor GST31 placed at the lowermost end in the third direction z, a plurality of memory cells M31_1 to M31_8 stacked sequentially in the third direction z on the ground select transistor GST31, and a string select transistor SST31 stacked in the third direction z on the uppermost memory cell M31_8.

The memory cells located at the same height in the third direction z from the substrate (not shown) or the ground select transistor may be electrically connected in common through respective word lines. For example, the memory cells of a height at which memory cells M11_1, M21_1, and M31_1 are formed may be connected to the first word line WL1. Further, the memory cells of a height at which memory cells M11_2, M21_2, and M31_2 are formed may be connected to the second word line WL2. Hereinafter, because the placement and structure of the memory cells connected to the third word line WL3 to the eighth word line WL8 are also similar thereto, the description thereof will not be repeated.

One end of each of the string select transistors of each of the plurality of cell strings NS11, NS21, NS31, NS12, NS22, NS32, NS13, NS23, and NS33 may be connected to the bit lines BL1, BL2, and BL3. For example, the string select transistors ST11, SST21, and SST31 may be connected to the bit line BL1 that extends in the second direction y. Because the description of other string select transistors connected to the bit lines BL2 and BL3 is similar thereto, a description thereof will not be repeated.

The memory cells corresponding to one string (or ground) select line and one word line may form one page. The write operation and the read operation may be performed in units of each page. Each memory cell on each page may also store two or more bits. The bits written to the memory cells of each page may form logical pages.

The memory cell array 310 may be provided as a three-dimensional memory array. The three-dimensional memory array may be formed monolithically at one or more physical levels of the arrays of the memory cells having an active region placed on a substrate (not shown) and circuits related to the operation of the memory cells. The circuits related to the operation of the memory cells may be located inside or above the substrate. The monolithic formation means that layers of each level of the 3D array may be deposited directly on the layers of the lower level of the 3D array. In other embodiments, a circuit related to the operation of the memory cell may be connected to the uppermost contact portion in the third direction z. Such embodiments will be described in detail through FIG. 6.

Figure 6:
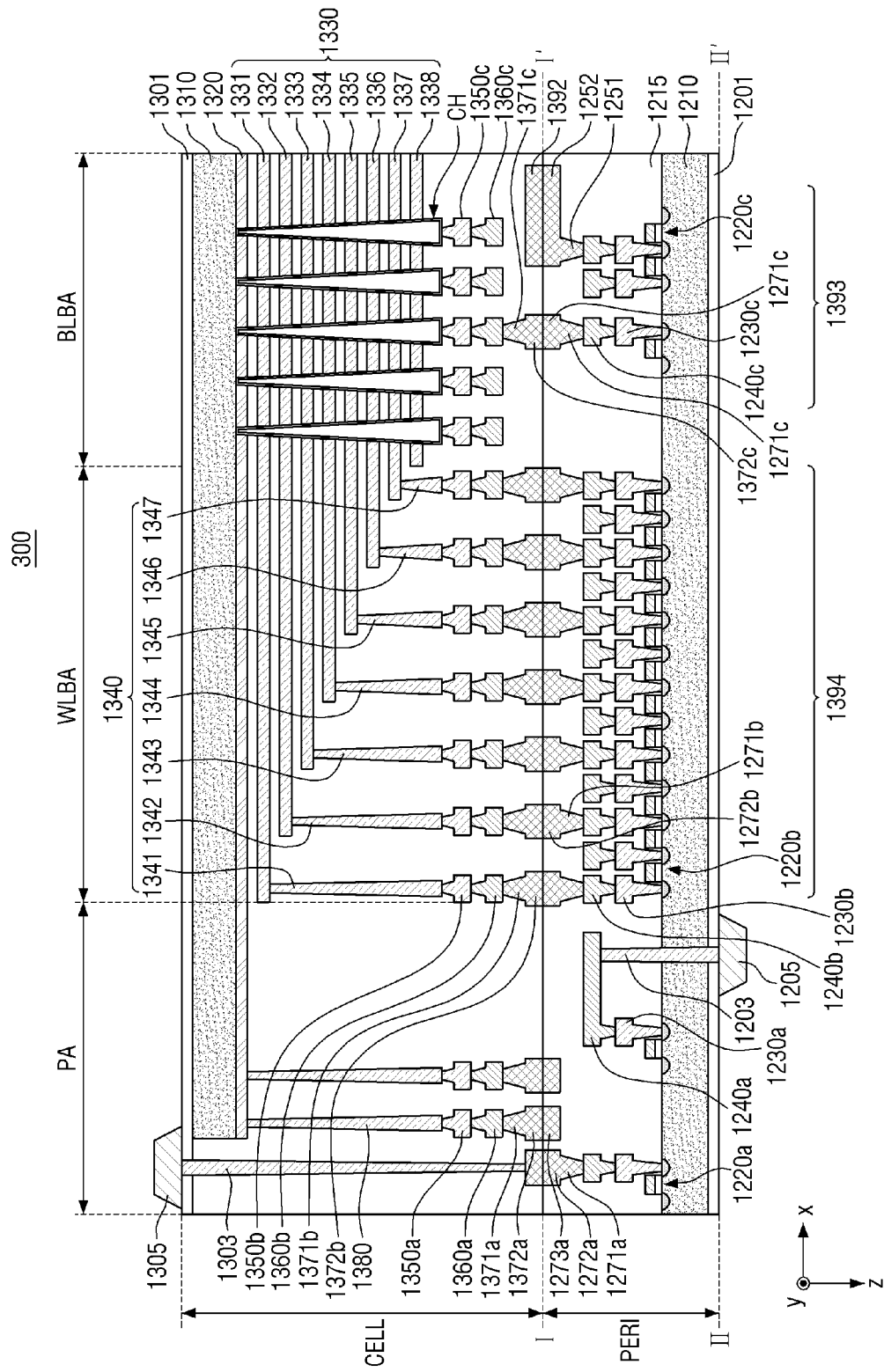
FIG. 6 is an example diagram illustrating an interior of a non-volatile memory according to some embodiments.

FIG. 6 is an example diagram that illustrates an interior of a non-volatile memory according to some embodiments.

Referring to FIG. 6, the non-volatile memory 300 according to some embodiments may have a chip to chip (C2C) structure. In FIG. 6, the cell region CELL of the non-volatile memory 300 may correspond to the memory cell array 310 of FIG. 5.

The C2C structure may mean a structure in which an upper chip including a cell region CELL is manufactured on a first wafer and a lower chip including a peripheral circuit region PERI is manufactured on a second wafer different from the first wafer, and then, the upper chip and the lower chip are connected to each other by a bonding mechanism. As an example, the bonding mechanism may mean a way of electrically connecting a bonding metal formed on an uppermost metal layer of the upper chip and a bonding metal formed on an uppermost metal layer of the lower chip to each other. For example, when the bonding metal is formed of copper (Cu), the bonding mechanism may be a Cu—Cu bonding mechanism, and the bonding metal may also be formed of aluminum or tungsten.

Each of the peripheral circuit region PERI and the cell region CELL of the non-volatile memory device 300, according to some embodiments, may include an external pad bonding region PA, a word line bonding region WLBA, and a bit line bonding region BLBA.

The peripheral circuit region PERI may include a first substrate 1210, an interlayer insulating layer 1215, a plurality of circuit elements 1220a, 1220b and 1220c formed on the first substrate 1210, first metal layers 1230a, 1230b and 1230c connected to each of the plurality of circuit elements 1220a, 1220b and 1220c, and second metal layers 1240a, 1240b and 1240c formed on the first metal layers 1230a, 1230b and 1230c. In an embodiment, the first metal layer 1230a, 1230b and 1230c may be formed of tungsten, which has a relatively high resistance, and the second metal layers 1240a, 1240b and 1240c may be formed of copper, which has a relatively low resistance.

Although only the first metal layers 1230a, 1230b and 1230c and the second metal layers 1240a, 1240b and 1240c are illustrated in the present specification, embodiments of the present disclosure are not limited thereto, and at least one or more metal layers may be further formed on the second metal layers 1240a, 1240b and 1240c. At least some of the one or more metal layers formed on the second metal layers 1240a, 1240b and 1240c may be formed of aluminum or the like, which has a lower resistance than the copper that forms the second metal layers 1240a, 1240b and 1240c.

The interlayer insulating layer 1215 is placed on the first substrate 1210 to at least partially cover the plurality of circuit elements 1220a, 1220b and 1220c, the first metal layers 1230a, 1230b and 1230c, and the second metal layers 1240a, 1240b and 1240c, and may include insulating materials, such as silicon oxides and silicon nitrides.

Lower bonding metals 1271b and 1272b may be formed on the second metal layer 1240b of the word line bonding region WLBA. In the word line bonding region WLBA, the lower bonding metals 1271b and 1272b of the peripheral circuit region PERI may be electrically connected to the upper bonding metals 1371b and 1372b of the cell region CELL by a bonding mechanism, and the lower bonding metals 1271b and 1272b and the upper bonding metals 1371b and 1372b may be formed of aluminum, copper, tungsten, or the like.

The cell region CELL may provide at least one memory block. The cell region CELL may include a second substrate 1310 and a common source line 1320 (corresponding to CSL of FIG. 5). A plurality of word lines 1331 to 1338; 1330 (corresponding to WL1 to WL8 of FIG. 5) may be stacked on the second substrate 1310 along the third direction z perpendicular to an upper side of the second substrate 1310. The string select lines and the ground select line may be placed on each of the top and bottom of the word lines 1330, and a plurality of word lines 1330 may be placed between the string select lines and the ground select line.

In the bit line bonding region BLBA, the channel structure CH extends in a direction perpendicular to the upper side of the second substrate 1310 and may penetrate the word lines 1330, the string select lines, and the ground select line. The channel structure CH may include a data storage layer, a channel layer, a buried insulating layer, and the like, and the channel layer may be electrically connected to the first metal layer 1350c and the second metal layer 1360c. For example, the first metal layer 1350c may be a bit line contact, and the second metal layer 1360c may be a bit line (corresponding to BL1 to BL3 of FIG. 5). In an embodiment, the bit line 1360c may extend along the second direction y parallel to the upper side of the second substrate 1310.

In an embodiment shown in FIG. 6, a region in which the channel structure CH, the bit line 1360c, and the like are placed may be defined as the bit line bonding region BLBA. The bit line 1360c may be electrically connected to the circuit elements 1220c that provide a page buffer 1393 in the peripheral circuit region PERI in the bit line bonding region BLBA. As an example, the bit line 1360c is connected to the upper bonding metals 1371c and 1372c in the peripheral circuit region PERI, and the upper bonding metals 1371c and 1372c may be connected to the lower bonding metals 1271c and 1272c connected to the circuit elements 1220c of the page buffer 1393.

In the word line bonding region WLBA, the word lines 1330 may extend along the first direction x parallel to the upper side of the second substrate 1310, and may be connected to a plurality of cell contact plugs (1341 to 1347; 1340). The word lines 1330 and the cell contact plugs 1340 may be connected to each other with pads provided by extension of at least some of the word lines 1330 along the first direction x with different lengths. A first metal layer 1350b and a second metal layer 1360b may be connected sequentially to the upper parts of the cell contact plugs 1340 connected to the word lines 1330. The cell contact plugs 1340 may be connected to the peripheral circuit region PERI through the upper bonding metals 1371b and 1372b of the cell region CELL and the lower bonding metals 1271b and 1272b of the peripheral circuit region PERI in the word line bonding region WLBA.

The cell contact plugs 1340 may be electrically connected to the circuit elements 1220b that provide a row decoder 1394 in the peripheral circuit region PERI. In an embodiment, the operating voltage of the circuit elements 1220b that provide the row decoder 1394 may differ from the operating voltage of the circuit elements 1220c that provide the page buffer 1393. As an example, the operating voltage of the circuit elements 1220c that provide the page buffer 1393 may be higher than the operating voltage of the circuit elements 1220b that provide the row decoder 1394.

A common source line contact plug 1380 may be placed in the external pad bonding region PA. The common source line contact plug 1380 may be formed of a conductive material, such as metal, metal compound or polysilicon, and may be electrically connected to the common source line 1320. The first metal layer 1350a and the second metal layer 1360a may be stacked sequentially on the upper part of the common source line contact plug 1380. As an example, a region in which the common source line contact plug 1380, the first metal layer 1350a, and the second metal layer 1360a are placed may be defined as an external pad bonding region PA.

In some embodiments, I/O pads 1205 and 1305 may be placed in the external pad bonding region PA. Referring to FIG. 6, a lower insulating film 1201, which at least partially covers the lower side of the first substrate 1210 may be formed below the first substrate 1210, and a first I/O pad 1205 may be formed on the lower insulating film 1201. The first I/O pad 1205 is attached to at least one of a plurality of circuit elements 1220a, 1220b and 1220c placed in the peripheral circuit region PERI through the first I/O contact plug 1203, and may be separated from the first substrate 1210 by the lower insulating film 1201. Further, a side insulating film may be placed between the first I/O contact plug 1203 and the first substrate 1210 to electrically separate the first I/O contact plug 1203 and the first substrate 1210 from each other.

Referring to FIG. 6, an upper insulating film 1301, which at least partially covers the upper side of the second substrate 1310, may be formed on the second substrate 1310, and a second I/O pad 1305 may be placed on the upper insulating film 1301. The second I/O pad 1305 may be connected to at least one of a plurality of circuit elements 1220a, 1220b and 1220c placed in the peripheral circuit region PERI through the second I/O contact plug 1303.

According to some embodiments, the second substrate 1310, the common source line 1320 and the like may not be placed in a region in which the second I/O contact plug 1303 is placed. Further, the second I/O pad 1305 may not overlap the word lines 1380 in the third direction z. Referring to FIG. 6, the second I/O contact plug 1303 is separated from the second substrate 1310 in a direction parallel to the upper side of the second substrate 1310, penetrates the interlayer insulating layer 1315 of the cell region CELL, and may be connected to the second I/O pad 1305.

According to some embodiments, the first I/O pad 1205 and the second I/O pad 1305 may be selectively formed. As an example, the non-volatile memory device 300 according to some embodiments may include only the first I/O pad 1205 placed on the upper part of the first substrate 1201, or may include only the second I/O pad 1305 placed on the upper part of the second substrate 1301. In other embodiments, the non-volatile memory device 300 may include both the first I/O pad 1205 and the second I/O pad 1305.

In each of the external pad bonding region PA and the bit line bonding region BLBA included in each of the cell region CELL and the peripheral circuit region PERI, the metal pattern of the uppermost metal layer is present as a dummy pattern, or the uppermost metal layer may be empty.

The non-volatile memory device 300 according to some embodiments may form a lower metal pattern 1273a of the same form as the upper metal pattern 1372a of the cell region CELL on the uppermost metal layer of the peripheral circuit region PERI to correspond to the upper metal pattern 1372a formed on the uppermost metal layer of the cell region CELL, in the external pad bonding region PA. The lower metal pattern 1273a formed on the uppermost metal layer of the peripheral circuit region PERI may not be connected to a separate contact in the peripheral circuit region PERI. Similarly, an upper metal pattern of the same form as the lower metal pattern of the peripheral circuit region PERI may be formed on the upper metal layer of the cell region CELL to correspond to the lower metal pattern formed on the uppermost metal layer of the peripheral circuit region PERI, in the external pad bonding region PA.

Lower bonding metals 1271b and 1272b may be formed on the second metal layer 1240b of the word line bonding region WLBA. In the word line bonding region WLBA, the lower bonding metals 1271b and 1272b of the peripheral circuit region PERI may be electrically connected to the upper bonding metals 1371b and 1372b of the cell region CELL by a bonding mechanism.

Further, an upper metal pattern 1392 of the same form as the lower metal pattern 1252 of the peripheral circuit region PERI may be formed on the uppermost metal layer of the cell region CELL to correspond to the lower metal pattern 1252 formed on the uppermost metal layer of the peripheral circuit region PERI, in the bit line bonding region BLBA. A contact may not be formed on the upper metal pattern 1392 formed on the uppermost metal layer of the cell region CELL.

Hereinafter, an electronic device 1 including the memory interface control module 240 will be described referring to FIG. 7.

Figure 7:
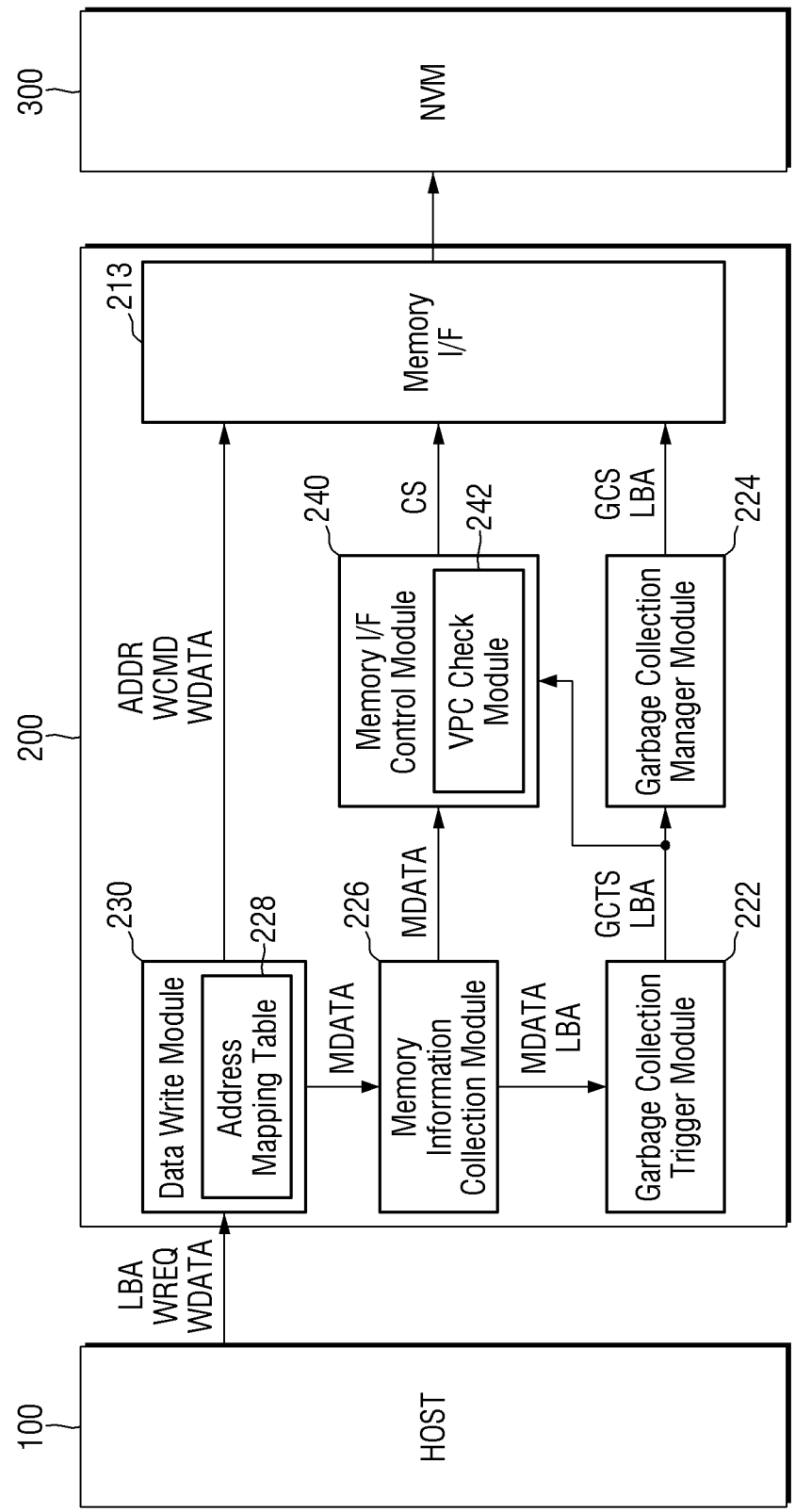
FIG. 7 is a block diagram that illustrates an electronic device, which performs garbage collection according to some embodiments.

FIG. 7 is a block diagram that illustrates an electronic device, which is configured to perform garbage collection according to some embodiments.

Referring to FIG. 7, the electronic device 1 may include a host 100, a memory controller 200, and a non-volatile memory 300. Here, the host 100, the memory controller 200, and the non-volatile memory 300 may be electrically connected to each other. The memory controller 200 may be configured to write data to or read data from the non-volatile memory 300 in response to a signal from the host 100. However, in the embodiment of the present disclosure, an example in which the memory controller 200 writes data to the non-volatile memory 300 will be described.

The memory controller 200 may include a memory interface 213, a data write module 230, a garbage collection trigger module 222, a garbage collection manager module 224, a memory information collection module 226, and a memory interface control module 240. Here, the data write module 230, the garbage collection trigger module 222, the garbage collection manager module 224, the memory information collection module 226, and the memory interface control module 240 may be implemented by the working memory 220 of FIG. 2. That is, the data write module 230, the garbage collection trigger module 222, the garbage collection manager module 224, the memory information collection module 226, and the memory interface control module 240 may correspond to software embodied in a computer readable medium rather than physical modules. However, the embodiments of the present disclosure are not limited thereto.

The data write module 230 may include an address mapping table 228. The data write module 230 may be configured to receive a logical block address LBA, write data WDATA, and a write request signal WREQ from the host 100. The data write module 230 may be configured to control the non-volatile memory 300 so that the write data WDATA is written to the non-volatile memory 300 in response to the write request signal WREQ.

For example, the data write module 230 may be configured to convert the logical block address LBA into the address ADDR on the basis of the address mapping table 228. Here, the address ADDR may be a physical block address. The address mapping table 228 may be changed under the control of the memory controller 200.

The data write module 230 may be configured to provide the address ADDR, the write command WCMD, and the write data WDATA to the non-volatile memory 300. The non-volatile memory 300 may be configured to write the write data WDATA to the block of the memory cell array 310 corresponding to the address ADDR in response to the write command WCMD. However, embodiments according to the technical idea of the present disclosure are not limited thereto, and the non-volatile memory 300 may perform the read operation or may perform the erase operation. Here, the address ADDR, the write command WCMD, and the write data WDATA provided to the non-volatile memory 300 may be referred to as host data.

The address ADDR, the write command WCMD, and the write data WDATA may be transferred to the non-volatile memory 300 through the memory interface 213. The memory interface 213 may be configured to selectively provide the address ADDR, the write command WCMD, and the write data WDATA received from the data write module 230 among the plurality of data to the non-volatile memory 300. Although the memory interface 213 is shown as being included in the memory controller 200, the non-volatile memory 300 may also include the memory interface 213.

The memory information collection module 226 may be configured to receive and store meta data MDATA from the data write module 230. For example, the meta data MDATA may include information about the address ADDR and the write data WDATA. That is, the meta data MDATA may include information about the address mapping table 228. The memory information collection module 226 may be configured to generate free block counts and valid page counts of memory blocks included in the non-volatile memory 300, using the meta data MDATA. In some embodiments, the free block count means a ratio of the number of free blocks to the total number of memory block, and the valid page count means a ratio of the valid pages to all the pages in the memory block. The memory information collection module 226 may be configured to store the meta data MDATA including the free block counts and the valid page counts, and may be configured to provide them to the garbage collection trigger module 224 and the memory interface control module 240.

The garbage collection trigger module 222 may be configured to receive the meta data MDATA and the logical block address LBA from the memory information collection module 226. The garbage collection trigger module 222 may be configured to determine whether to perform garbage collection on the non-volatile memory 300 on the basis of the meta data MDATA and the logical block address LBA. For example, when the free block count included in the meta data MDATA is less than a certain value, the garbage collection trigger module 222 may provide a logical block address LBA and a garbage collection trigger signal GCTS to the garbage collection manager module 224. However, embodiments of the present disclosure are not limited thereto, and the garbage collection trigger module 222 may be configured to determine whether to perform the garbage collection on the basis of the meta data MDATA other than the free block count.

Further, the garbage collection trigger module 222 may be configured to provide the logical block address LBA and the garbage collection trigger signal GCTS.

The garbage collection manager module 224 may be configured to perform the garbage collection on the non-volatile memory 300 in response to the garbage collection trigger signal GCTS. For example, the garbage collection manager module 224 may be configured to transfer the address ADDR corresponding to the logical block address LBA to the non-volatile memory 300, and transmit the garbage collection signal GCS. Here, the garbage collection signal GCS may include a write command and an erase command, but embodiments according to the technical idea of the present disclosure are not limited thereto.

The non-volatile memory 300 may be configured to perform the garbage collection operation via execution of the garbage collection manager module 224. For example, the valid page of the block corresponding to the address ADDR may be copied to another block. Further, the block corresponding to the address ADDR may be erased after being designated as an invalid page. The block corresponding to the address ADDR may be a free block, and the performance of the memory storage device 10 can be improved accordingly.

The garbage collection signal GCS may be transmitted to the non-volatile memory 300 through the memory interface 213. The memory interface 213 may be configured to selectively provide the garbage collection signal GCS, which is received from the garbage collection manager module 224 among the plurality of data, to the non-volatile memory 300.

The memory interface control module 240 may receive the meta data MDATA, the garbage collection trigger signal GCTS, and the logical block address LBA. The memory interface control module 240 may be configured to control the memory interface 213 on the basis of the meta data MDATA, the garbage collection trigger signal GCTS, and the like. For example, the memory interface control module 240 may be configured to control the memory interface 213 using the control signal CS. However, the memory interface control module 240 may not be configured to control the memory interface 213 when outputting the control signal CS. In this case, the memory interface 213 may transmit the received signal without limitation.

A valid page count check module 242 of the memory interface control module 240 may be configured to control the memory interface 213 on the basis of the valid page count included in the meta data MDATA. Further, the memory interface control module 240 may be configured to control the memory interface 213 in response to the garbage collection trigger signal GCTS. A more detailed description of embodiments thereof will be provided below.

The memory interface 213 may be configured to control the capacity of the signal transmitted in response to the control signal CS. For example, the memory interface 213 may be configured to receive the address ADDR, to receive the write command WCMD, and to receive the write data WDATA from the data write module 230, and may be configured to receive the garbage collection signal GCS and the address ADDR from the garbage collection manager module 224. The memory interface 213 may be configured to control the transmission capacity of the signals. The memory interface 213 may also be configured to provide the signals to the non-volatile memory 300.

A method of performing the garbage collection operation and controlling the memory interface 213, according to some embodiments, will be described referring to FIGS. 8 to 10.

Figure 8:
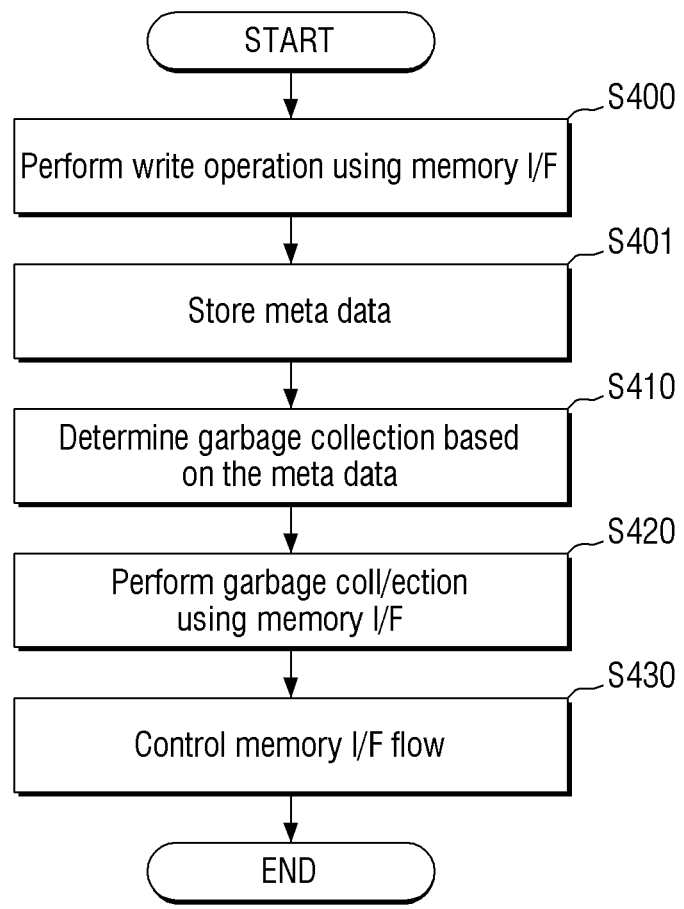
FIG. 8 is a flowchart illustrating operations for performing the garbage collection according to some embodiments.

FIG. 8 is a flowchart of the method of performing the garbage collection operation according to some embodiments. FIG. 9 is a conceptual diagram that illustrates the garbage collection operation of the memory storage device according to some embodiments. FIG. 10 is a conceptual diagram that illustrates the valid page count ratio of the memory storage device according to some embodiments.

Referring to FIGS. 7 and 8, the memory storage device 10 may perform a write operation using the memory interface 213 (S400). For example, the data write module 230 may provide the address ADDR, the write command WCMD, and the write data WDATA from the host 100 to the memory interface 213, and the memory interface 213 signal may provide the signals to the non-volatile memory 300. Therefore, the write data WDATA may be programmed in the memory block of the non-volatile memory 300 corresponding to the address ADDR. The write operation may continue to be performed while garbage collection is being performed.

At this time, the non-volatile memory 300 may store the meta data MDATA (S401). That is, the meta data MDATA included in the write data WDATA may be stored in the non-volatile memory 300. Further, the meta data MDATA may be transferred to the memory information collection module 226, and the memory information collection module 226 may store the meta data MDATA. The meta data MDATA may be provided to the garbage collection trigger module 222 and the memory interface control module 240 through the memory information collection module 226.

The memory storage device 10 determines whether to perform the garbage collection on the basis of the meta data MDATA (S410). For example, the garbage collection trigger module 222 may determine whether to perform the garbage collection on the basis of the meta data MDATA, and provide the garbage collection trigger signal GCTS to the garbage collection manager module 224. Next, the garbage collection manager module 224 may perform the garbage collection operation in response to the garbage collection trigger signal GCTS.

The memory storage device 10 may perform the garbage collection operation using the memory interface 213 (S420). The garbage collection manager module 224 may provide the garbage collection signal GCS to the memory interface 213, and the memory interface 213 may provide the garbage collection signal GCS to the non-volatile memory 300. The non-volatile memory 300 may perform the garbage collection on the basis of the garbage collection signal GCS.

At this time, the memory storage device 10 may control the data flow of the memory interface 213 (S430). The memory interface 213 may receive the write data WDATA and the garbage collection signal GCS. The memory interface 213 may control the transmission capacity of the write signal including the write data WDATA and the garbage collection signal GCS. Such embodiments will be described in more detail below.

A type of garbage collection operation will be described referring to FIG. 9.

In the non-volatile memory 300, there may be a difference between a logical free block recognized by the host 100 and a physical free block existing in the actual non-volatile memory 300. This is because overwriting of data on the same logical address is not performed as the feature of flash memory.

That is, when the host 100 requests to overwrite the data on the same logical address, the existing data remains as old data at the existing physical address and the new data may be written to the new physical address. In such cases, the old data remains while filling the physical free block in an invalid state.

Therefore, although the host 100 may request a new write operation on an empty logical address, that is, a logical free block, actually, the physical free block is filled with old data and may not exist. At this time, the memory controller 200 may secure a physical free block corresponding to the logical free block through the garbage collection.

Figure 9:
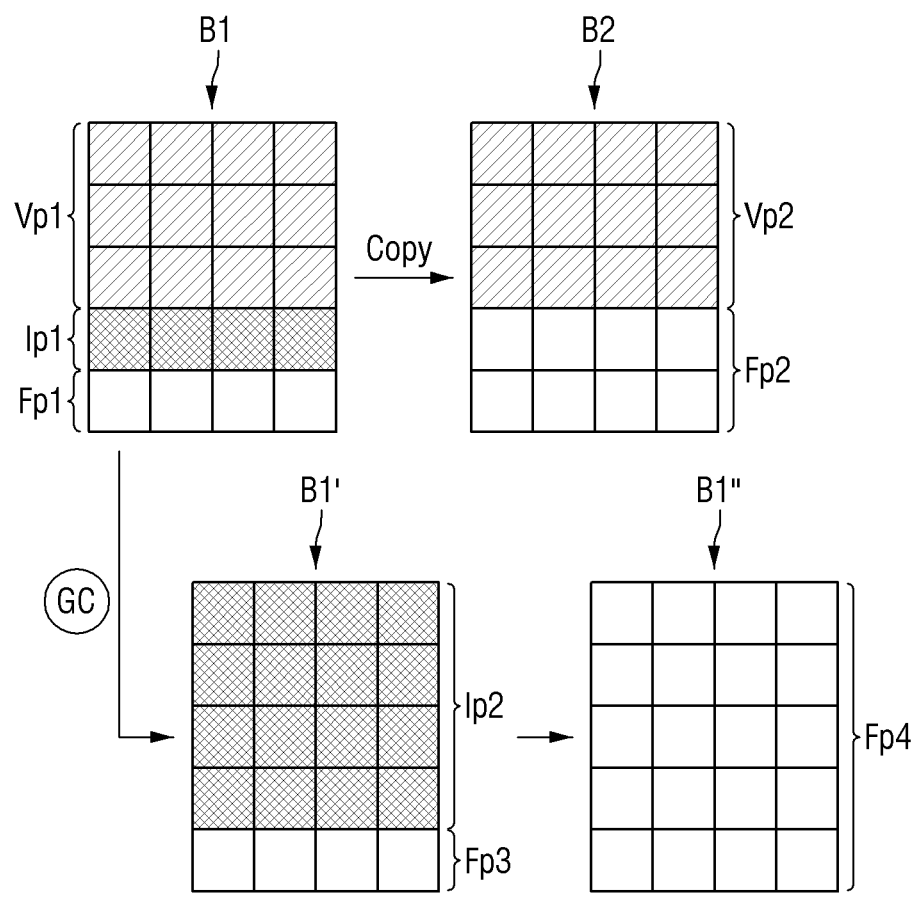
FIG. 9 is a conceptual diagram that illustrates the garbage collection operation of the memory storage device according to some embodiments.

A first block B1 of FIG. 9 may include a plurality of pages. A part of the plurality of pages is a first valid page Vp1 on the which valid data is written, the other part of the plurality of pages is a first invalid page Ip1 on which the data of the invalid state is recorded, and the rest of the plurality of pages may be a first free page Fp1 on which no data is recorded. However, the aforementioned configuration is merely an example for illustration, and the actual block configuration may be any configuration including at least one of the invalid page, the valid page, and the free page.

When the garbage collection progresses under control of the memory controller 200, the first valid page Vp1 of the first block B1 may be copied to another free block, that is, a second block B2. That is, the second block B2 may include the second valid page Vp2 to which the first valid page Vp1 is copied. However, because the first invalid page Ip1 of the first block B1 is not copied to the second block B2, the second block B2 may include only the first valid page Vp1 and the second free page Fp2 on which nothing is recorded.

The first block B1 may be changed to a first conversion block B1' by the garbage collection GC. That is, both the first valid page Vp1 and the first invalid page Ip1 in the first block B1 may be converted into an invalid second invalid page Ip2. The first free page Fp1 in the first block B1 may remain as a third free page Fp3 on which nothing is recorded yet. Therefore, the first conversion block B1' may include only the second invalid page Ip2 and the third free page Fp3.

Later, the first conversion block B1' may be changed to a first conversion free block B1" according to a command such as secure erase. That is, a block having only the invalid page and the free page inside without valid page may be changed to have only the free page as a whole. That is, both the second invalid page Ip2 and the third free page Fp3 of the first conversion block B1' may be converted into a fourth free page Fp4.

Such an operation of garbage collection may secure the free block, by transferring the data recorded in the first valid page Vp1 of the existing first block B1 to the second valid page of the second block B2 and preserving the data, and by converting the first block B1 into the first conversion free block B1" including only the fourth free page Fp4.

Figure 10:
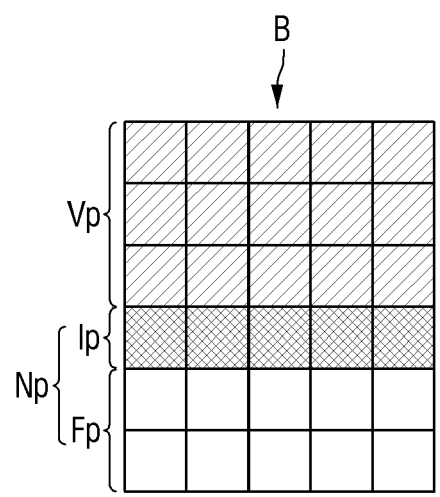
FIG. 10 is a conceptual diagram that illustrates the valid page count ratio of the memory storage device according to some embodiments.

Referring to FIG. 10, a block B may include at least one of the valid page Vp, the invalid page Ip, and the free page Fp. As described above, the valid page Vp is a page on which the valid data is recorded, and the invalid page Ip is a page on which the invalid old data is recorded. The free page Fp is a page on which no data is recorded.

The invalid page Ip and the free page Fp except the valid page Vp may be defined as an invalid page Np.

A valid page count ratio of the block B may mean a ratio of the valid page Vp among all the pages constituting the block B.

That is, the valid page count ratio may be defined by Formula 1.

$$Vr=Vp/(Vp+Np)=Vp/(Vp+Ip+Fp) \qquad \text{<Formula 1>}$$

Here, Vr is the valid page count ratio, Vp is the number of valid pages, Np is the number of non-valid pages, Ip is the number of invalid pages, and Fp is the number of free pages.

The meta data MDATA may include information about such valid page counts. In addition, the meta data MDATA may include a free block count of the non-volatile memory.

Hereinafter, the memory storage device 10 that controls the memory interface 213 will be described referring to FIGS. 11 to 15.

Figure 11:
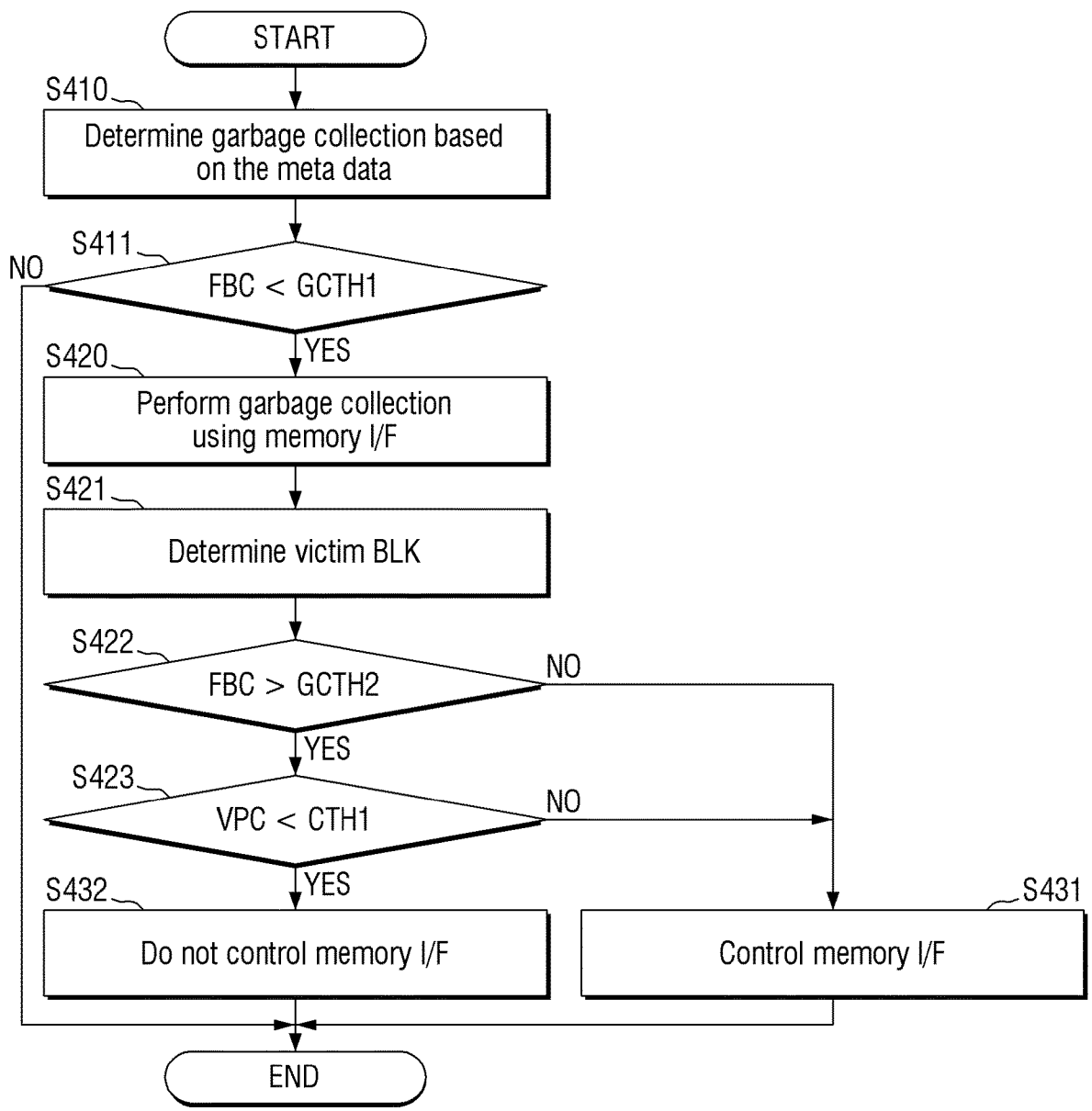
FIG. 11 is a flowchart that illustrates the control of a ratio of the host data and the garbage collection data in the memory interface according to some embodiments.
Figure 12:
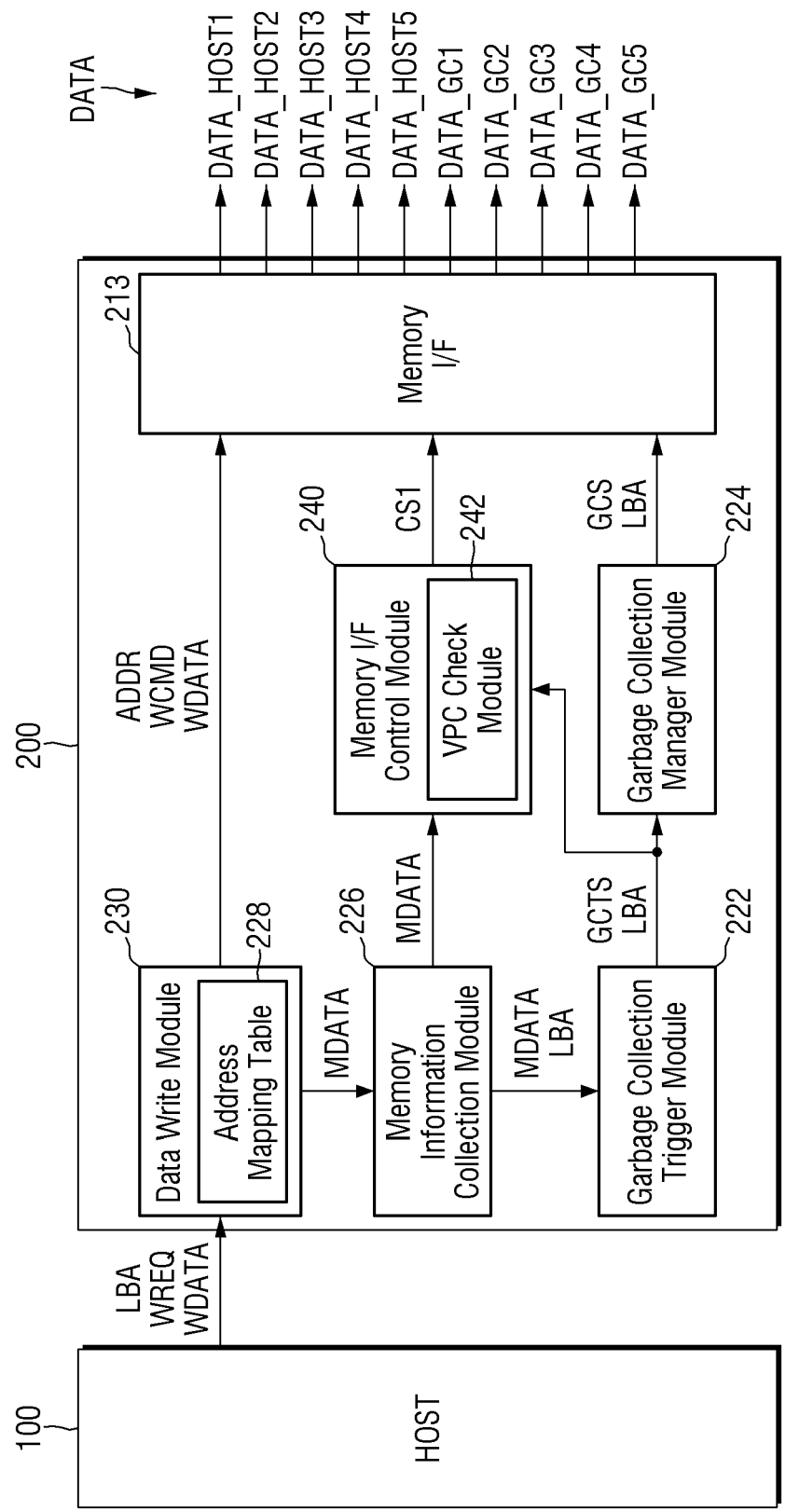
FIGS. 12 to 14 are diagrams that illustrate the control of the ratio of the host data and the garbage collection data of FIG. 11.
Figure 13:
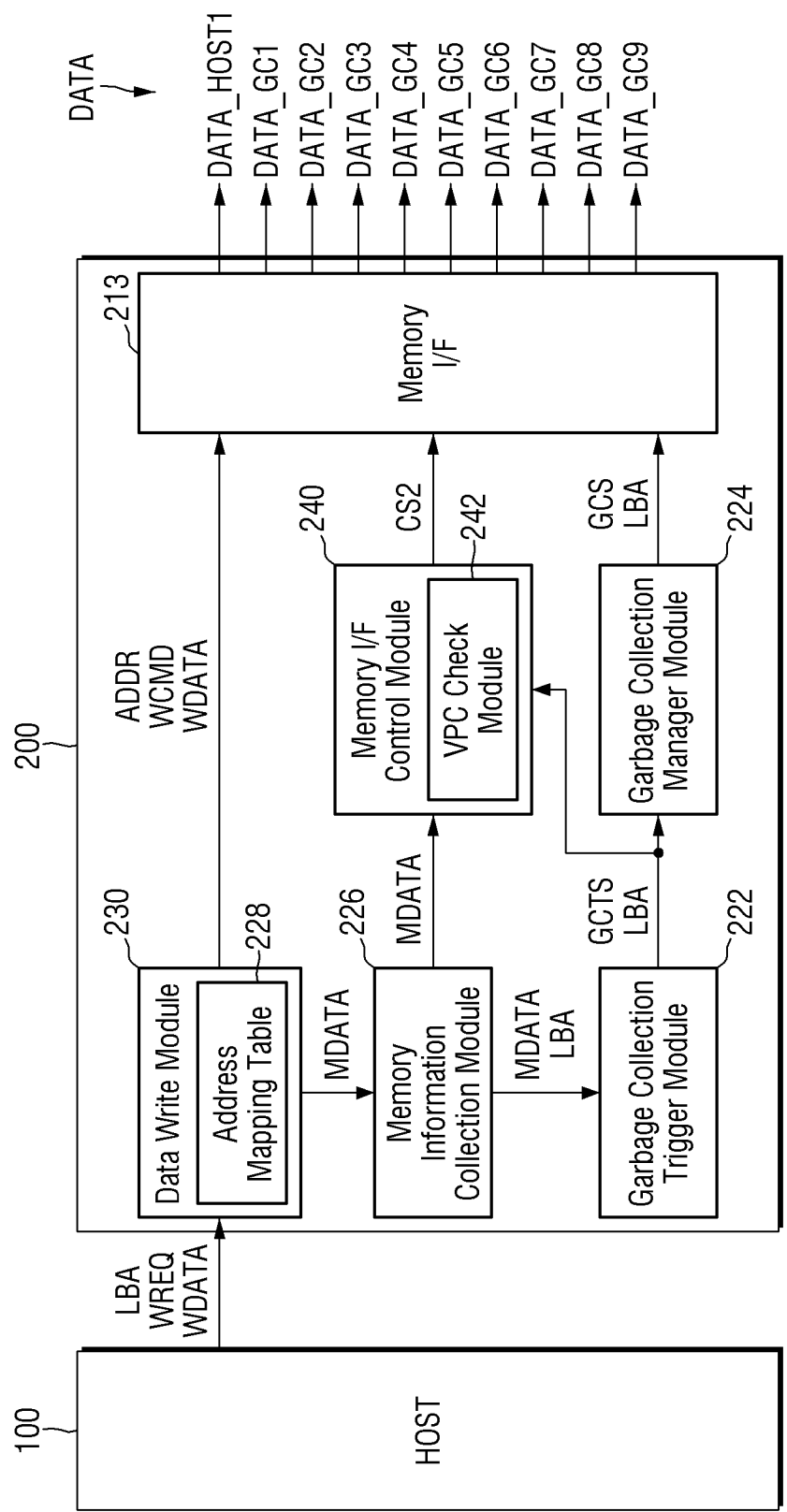
Figure 14:
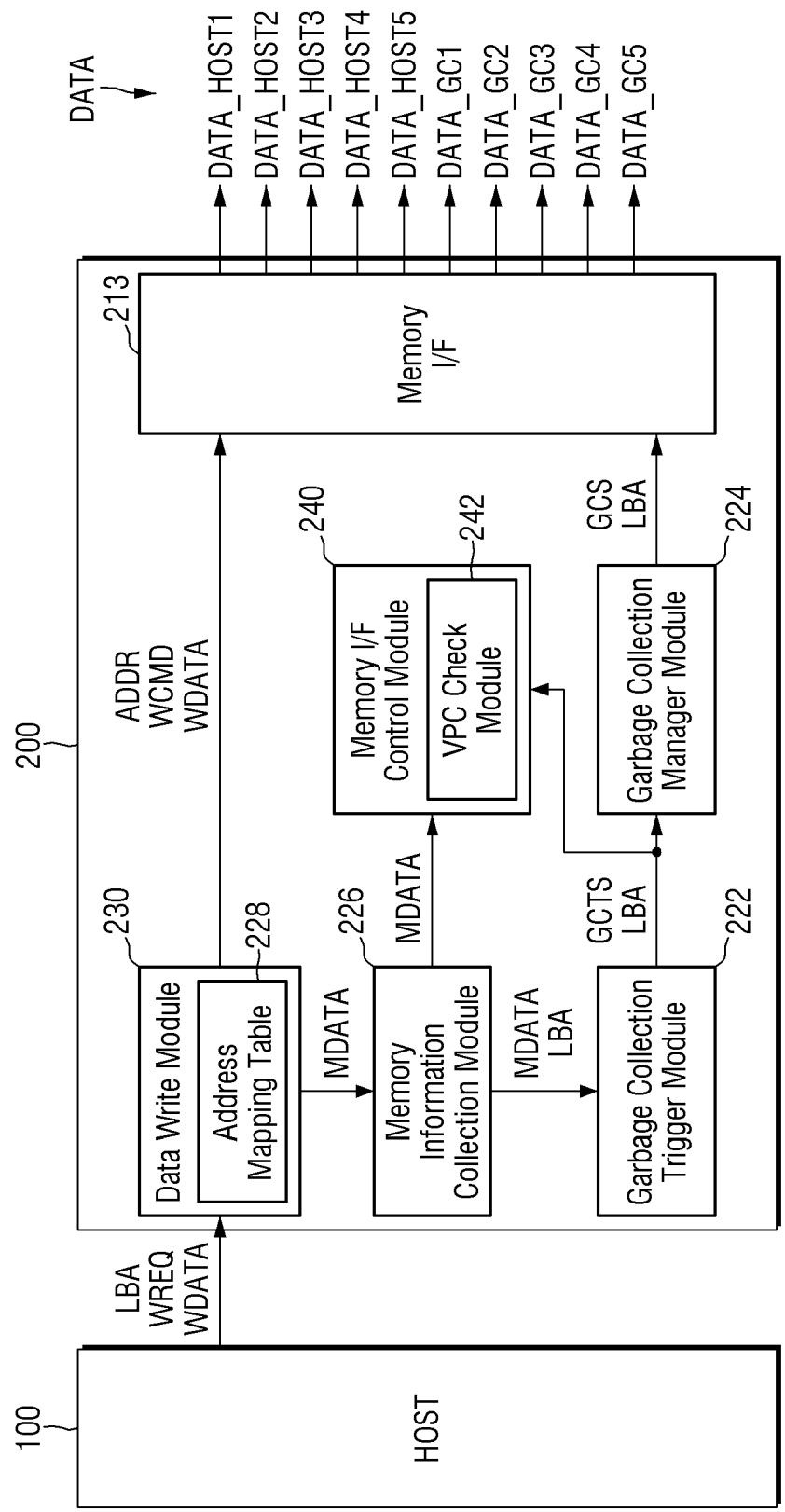
Figure 15:
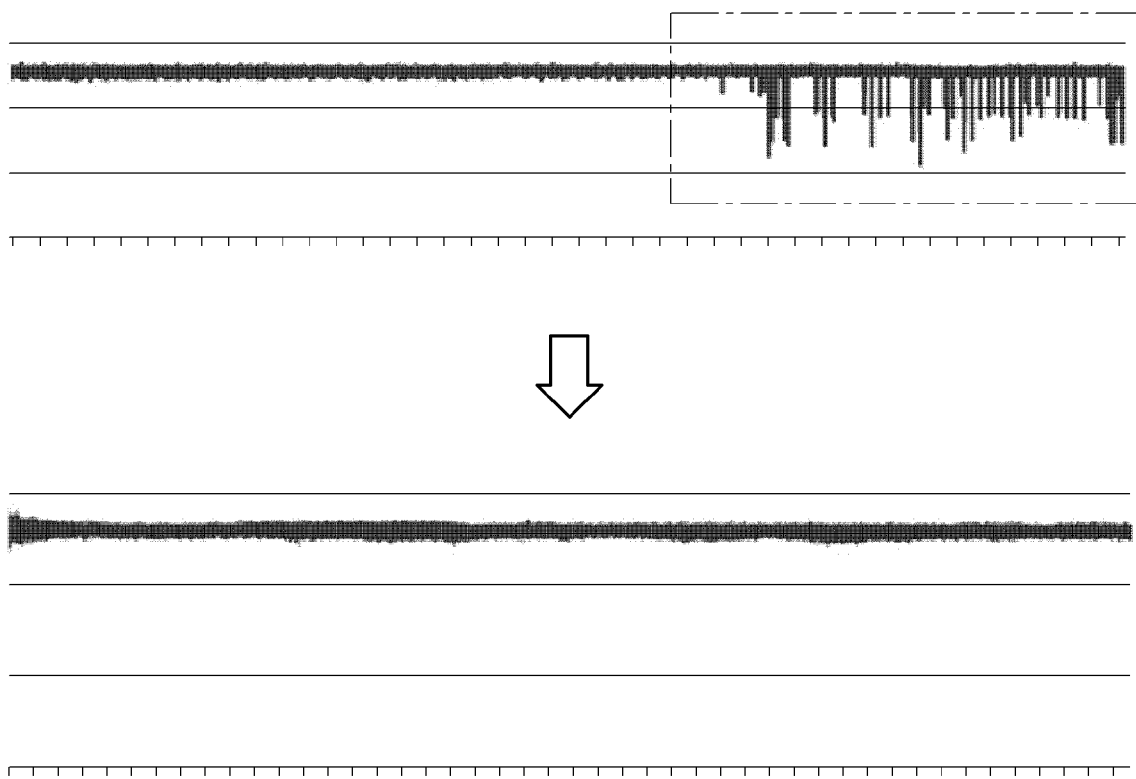
FIG. 15 is a diagram that illustrates the effect when the ratio of the host data and the garbage collection data is not controlled in the memory interface according to some embodiments.

FIG. 11 is a flowchart that illustrates the control of a ratio of the host data and the garbage collection data in the memory interface according to some embodiments. FIGS. 12 to 14 are diagrams that illustrate the control of the ratio of the host data and the garbage collection data of FIG. 11. FIG. 15 is a diagram that illustrates the effect when the ratio of the host data and the garbage collection data is not controlled in the memory interface according to some embodiments.

Referring to FIGS. 11 and 12, the memory controller 200 may determine whether to perform the garbage collection on the basis of the meta data MDATA (S410). For example, the memory controller 200 may determine whether a free block count FBC is less than a first garbage collection threshold value GCTH1 (S411). Specifically, the garbage collection trigger module 222 may determine whether the free block count FBC included in the meta data MDATA is less than the first garbage collection threshold value GCTH1. When the free block count FBC is not less than the first garbage collection threshold value GCTH1 (S411—NO), the operation may be ended. When the free block count FBC is less than the first garbage collection threshold value GCTH1 (S411—YES), the memory storage device 10 may perform the garbage collection using the memory interface 213 (S420). That is, when the free block count FBC of the non-volatile memory 300 becomes less than the first garbage collection threshold value GCTH1, the memory storage device 10 may perform the garbage collection on the non-volatile memory. At this time, the garbage collection trigger module 222 may provide the garbage collection trigger signal GCTS to the garbage collection manager module 224, and the garbage collection manager module 224 may provide the garbage collection signal GCS to the memory interface (213). The memory interface 213 may provide the garbage collection signal GCS to the non-volatile memory 300.

The memory storage device 10 may determine a victim memory block in which the garbage collection is performed (S421). The memory interface control module 240 may determine whether to control the memory interface 213 on the basis of the free block count FBC and the valid page count VPC included in the meta data MDATA. At this time, the memory interface control module 240 may control the memory interface 213 using the valid page count VPC for the victim memory block.

The memory interface control module 240 may determine whether the free block count FBC is greater than a second garbage collection threshold value GCTH2 (S422). Here, the second garbage collection threshold value GCTH2 may be less than the first garbage collection threshold value GCTH1. When the free block count FBC is not greater than the second garbage collection threshold value GCTH2 (S422—NO), the memory interface control module 240 may control the memory interface 213 (S431). That is, when the free block count FBC is less than the second garbage collection threshold value GCTH2 and less than the first garbage collection threshold value GCTH1, the garbage collection operation may take precedence over the write operation. Therefore, in this case, the memory interface control module 240 controls the memory interface 213 so that the garbage collection may be performed.

Referring to FIGS. 12 and 13, when the first control signal CS1 is received, the memory interface 213 may output first to fifth host data DATA_HOST1 to DATA_HOST5, and may output first to fifth garbage collection data DATA_GC1 to DATA_GC5. At this time, the transfer capacity of the host data may be the same as the transfer capacity of the garbage collection data.

However, the memory interface 213 may be controlled in response to the second control signal CS2. At this time, the memory interface control module 240 may provide the second control signal CS2 to the memory interface 213 in the case of S431 of FIG. 11. The memory interface 213 may output the first host data DATA_HOST1 and output the first to ninth garbage collection data DATA_GC1 to DATA_GC9. That is, the transfer capacity of the garbage collection data may be greater than the transfer capacity of the host data. Accordingly, the garbage collection operation may take precedence over the write operation.

Referring again to FIG. 11, when the free block count FBC is greater than the second garbage collection threshold value GCTH2 (S422—YES), the memory interface control module 240 may determine whether the valid page count VPC of the victim memory block is less than a first control threshold value CTH1 (S423).

When the valid page count VPC of the victim memory block is not less than the first control threshold value CTH1 (S423—NO), the memory interface control module 240 may control the memory interface 213 (S431). That is, when the valid page count VPC is greater than or equal to the first control threshold value CTH1, the memory interface 213 may be controlled, and the garbage collection operation may take precedence over the write operation.

When the valid page count VPC of the victim memory block is less than the first control threshold value CTH1 (S423—YES), the memory interface control module 240 may not control the memory interface 213 (S432).

Referring to FIG. 14, the memory interface control module 240 may not output the control signal CS. Therefore, the memory interface 213 may freely output the write data WDATA and the garbage collection signal GCS. When the memory interface 213 is controlled, a small capacity of host data is output and a larger capacity of garbage collection data may be output as in FIG. 13. However, when the memory interface 213 is not controlled, a larger capacity of host data may be output than a case where it is controlled. Referring to FIG. 15, when a random write is performed in the case where the memory interface 213 is controlled, the write operation of the host data may deteriorate. However, in a case where the memory interface 213 is not controlled under specific conditions, when the random write is performed, the write operation of host data may not deteriorate. Therefore, it may be possible to provide a memory storage device in which the performance of the non-volatile memory 300 is improved.

Hereinafter, the electronic device 1 which includes a memory controller 200 including a garbage collection prediction module 240 will be described referring to FIGS. 16 to 19.

Figure 16:
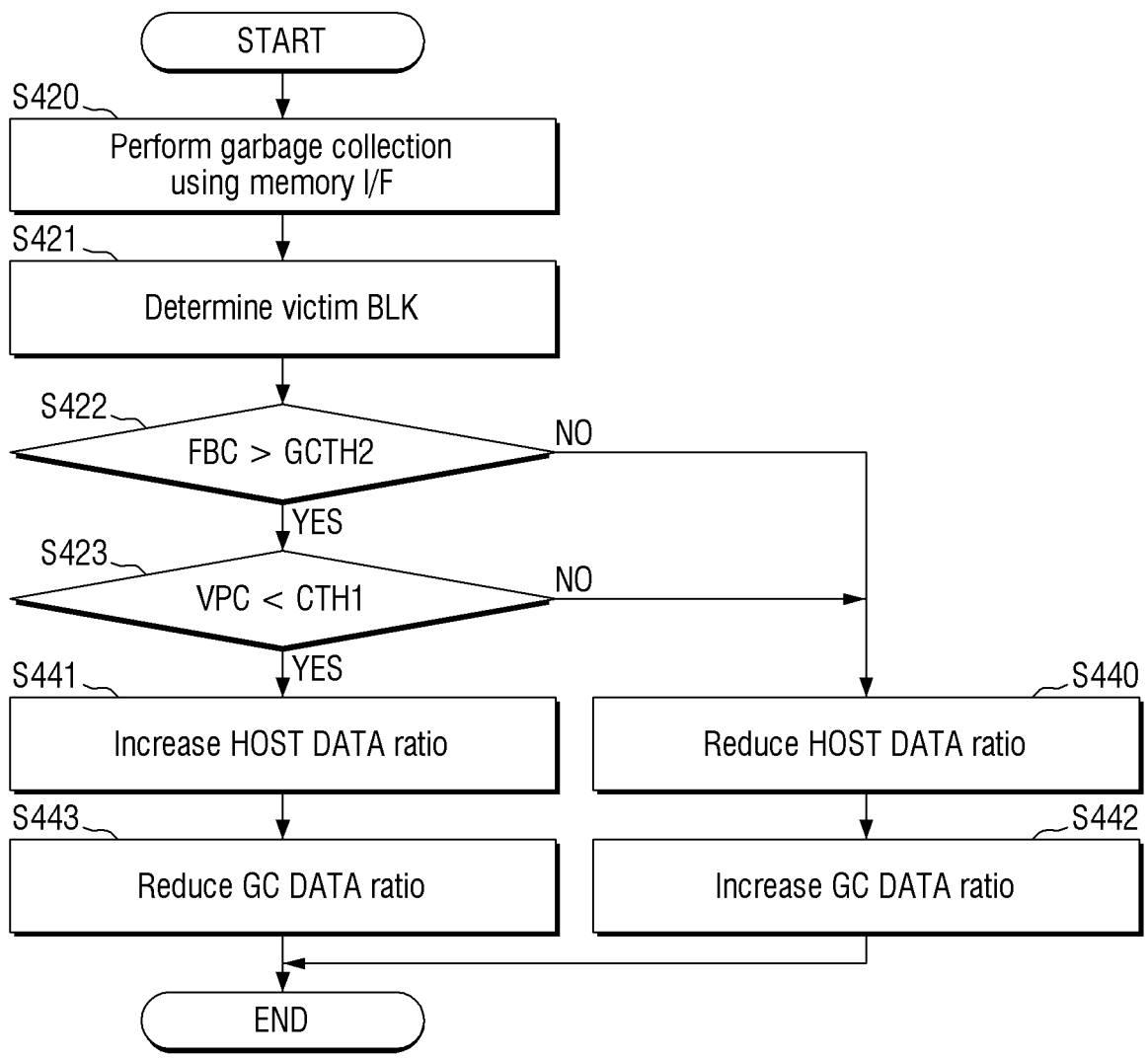
FIG. 16 is a flowchart that illustrates the control of the ratio of the host data and the garbage collection data in the memory interface according to some embodiments.
Figure 17:
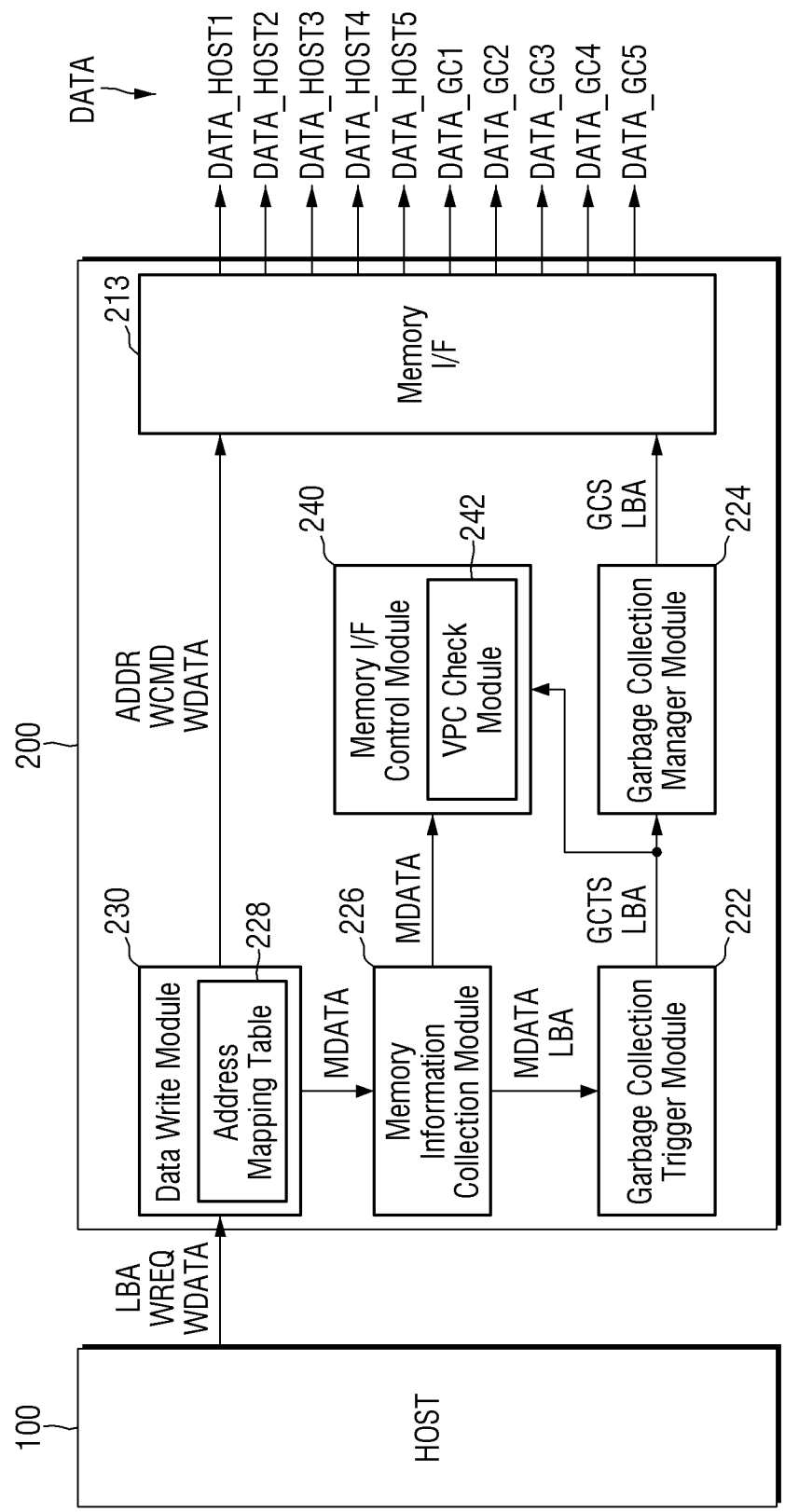
FIGS. 17 to 19 are diagrams that illustrates the control of the ratio of the host data and the garbage collection data of FIG. 16.
Figure 18:
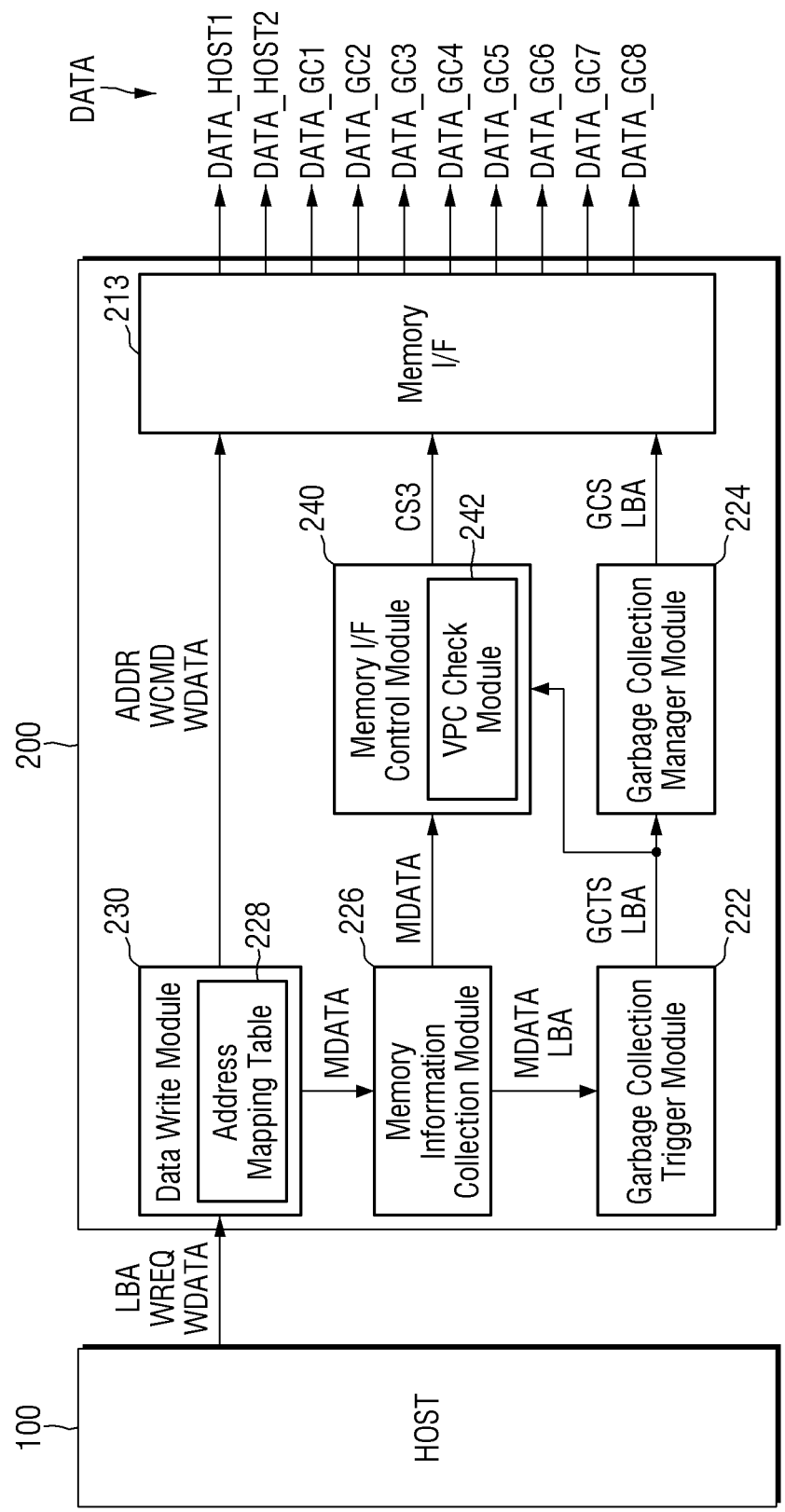
Figure 19:
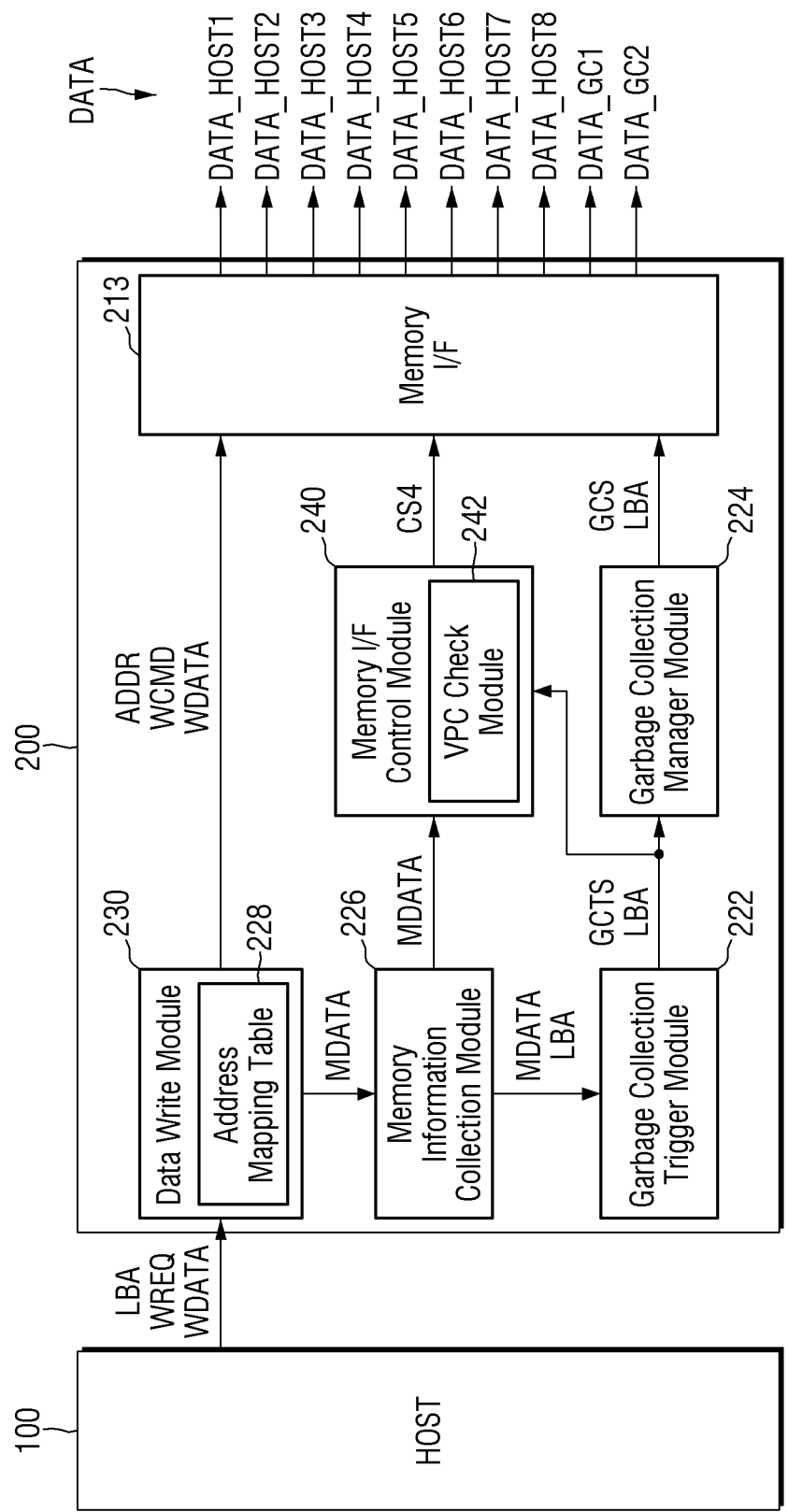

FIG. 16 is a flowchart that illustrates the control of the ratio of the host data and the garbage collection data in the memory interface according to some embodiments. FIGS. 17 to 19 are diagrams that illustrate the control of the ratio of the host data and the garbage collection data of FIG. 16. For convenience of explanation, repeated parts of content described using FIGS. 1 to 15 will be briefly described or omitted.

Referring to FIGS. 16 and 17, the memory controller 200 may perform the garbage collection operation using the memory interface 213 (S420) and may determine the victim memory block (S421).

The memory interface control module 240 may determine whether the free block count FBC is greater than the second garbage collection threshold value GCTH2 (S422). Referring to FIGS. 17 and 18, when the free block count FBC is not greater than the second garbage collection threshold value GCTH2 (S422—NO), the memory interface control module 240 may reduce the host data ratio of the interface 213 (S440), and may increase the garbage collection data ratio of the interface 213 (S442). That is, when the free block count FBC is less than the second garbage collection threshold value GCTH2 less than the first garbage collection threshold value GCTH1, the garbage collection operation may take precedence over the write operation.

In FIG. 18, the memory interface control module 240 may provide a third control signal CS3 to the memory interface 213, and thus, the memory interface 213 may output the first and second host data DATA_HOST1 and DATA_HOST2, and the first to eighth garbage collection data DATA_GC1 to DATA_GC8. This case corresponds to a case where the garbage collection operation takes precedence over the write operation.

Referring again to FIG. 16, when the free block count FBC is greater than the second garbage collection threshold value GCTH2 (S422—YES), the memory interface control module 240 may determine whether the valid page count VPC of the victim memory block is less than the first control threshold value CTH1 (S423).

When the valid page count VPC of the victim memory block is not less than the first control threshold value CTH1 (S423—NO), the memory interface control module 240 may decrease the host data ratio of the interface 213 (S440), and may increase the garbage collection data ratio of the interface 213 (S442). That is, when the valid page count VPC is not less than the first control threshold CTH1, the garbage collection operation may take precedence over the write operation.

When the valid page count VPC of the victim memory block is less than the first control threshold value CTH1 (S423—YES), the memory interface control module 240 may increase the host data ratio of the interface 213 (S441), and may decrease the garbage collection data ratio of the interface 213 (S443).

Referring to FIGS. 17 and 19, the memory interface control module 240 may provide the fourth control signal CS4 to the memory interface 213, and thus, the memory interface 213 may output the first and eighth host data DATA_HOST1 to DATA_HOST8 and the first and second garbage collection data DATA_GC1 and DATA_GC2. This case corresponds to a case where the write operation takes precedence over the garbage collection operation. In a case where the host write operation and the garbage collection operation of the memory interface 213 are controlled under specific conditions, when the random write is performed, the write operation of the host data may not deteriorate. Therefore, it is possible to provide a memory storage device in which the performance of the non-volatile memory 300 is improved.

Hereinafter, an electronic device 2 including a plurality of non-volatile memories 301, 302, and 303 will be described referring to FIG. 20.

Figure 20:
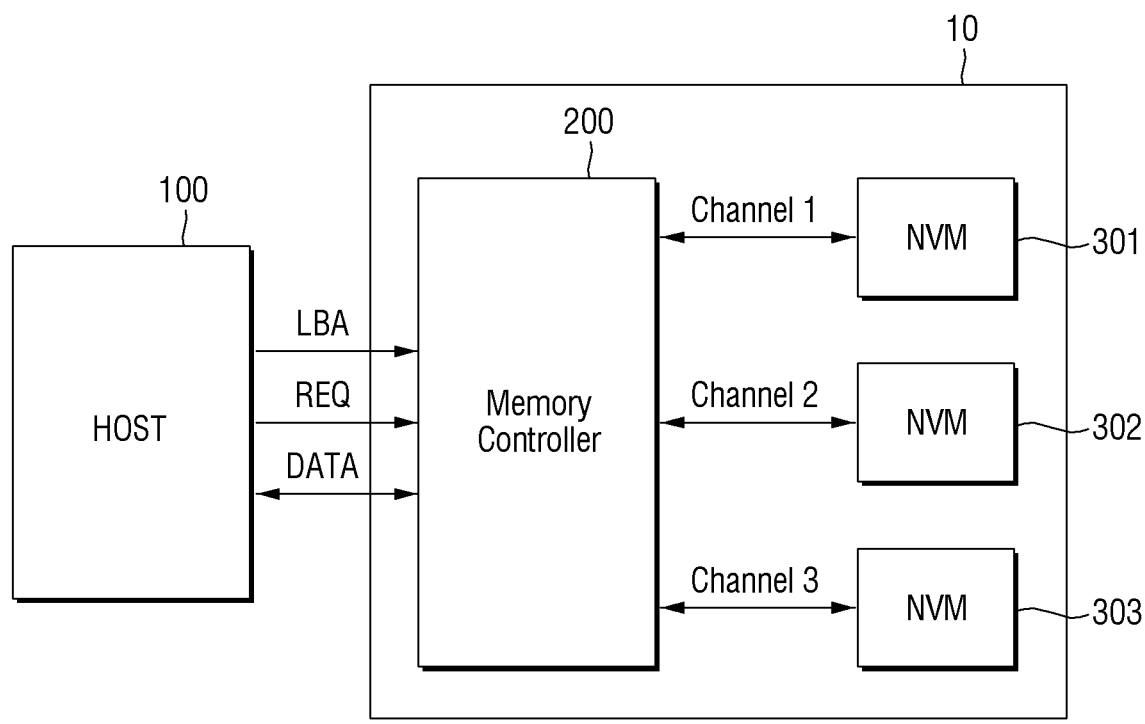
FIG. 20 is a block diagram that illustrates an electronic device according to some embodiments.

FIG. 20 is a block diagram that illustrates an electronic device according to some embodiments. For convenience of explanation, repeated parts of content described using FIGS. 1 to 19 will be briefly described or omitted.

Referring to FIG. 20, the memory storage device 10 may include a plurality of non-volatile memories 301, 302, and 303 connected to the memory controller 200.

Each of the non-volatile memories 301, 302, and 303 may be substantially the same as the non-volatile memory 300 described referring to FIG. 3. For example, each of the non-volatile memories 301, 302, and 303 may include a memory cell array 310, an address decoder 320, a voltage generator 330, a read/write circuit 340, a control logic 350, and the like.

The memory controller 200 and a non-volatile memory 301 may be connected through a first channel (Channel 1). The memory controller 200 and a non-volatile memory 302 may be connected through a second channel (Channel 2). The memory controller 200 and a non-volatile memory 303 may be connected through a third channel (Channel 3).

The memory interface control module 240 described referring to FIGS. 1 to 19 may be included in the memory controller 200. That is, the memory interface control module 240 may be configured to control the capacity of data provided from the interfaces between the plurality of non-volatile memories 301, 302, and 303 and the memory controller 200.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A memory storage device comprising:
a non-volatile memory including a plurality of memory blocks; and
a memory controller configured to control the non-volatile memory,
wherein the memory controller is configured to provide host data including write data to the non-volatile memory,
wherein the memory controller is configured to perform a garbage collection operation on the memory blocks to provide garbage collection data to the non-volatile memory when a free block count of the memory blocks is less than a first threshold value,
wherein the memory controller is configured to increase a capacity for providing the host data when the free block count of the memory blocks is greater than a second threshold value less than the first threshold value and a valid page count of a first memory block among the memory blocks is less than a third threshold value, and
wherein the memory controller is configured to decrease the capacity for providing the host data when a valid page count of a second memory block different from the first memory block among the memory blocks is equal to or greater than the third threshold value.

2. The memory storage device of claim 1, wherein the memory controller is configured not to perform the garbage collection operation on the memory blocks and not to provide the garbage collection data to the non-volatile memory when the free block count of the memory blocks is equal to or greater than the first threshold value.

3. The memory storage device of claim 1, wherein the memory controller is configured to increase a capacity for providing the garbage collection data when the valid page count of the second memory block different from the first memory block among the memory blocks is equal to or greater than the third threshold value.

4. The memory storage device of claim 1, wherein the memory controller is configured to decrease the capacity for providing the host data when the free block count of the memory blocks is equal to or less than the second threshold value.

5. The memory storage device of claim 1, wherein the memory controller is configured to decrease a capacity for providing the garbage collection data when the valid page count of the first memory block among the memory blocks is less than the third threshold value.

6. The memory storage device of claim 1, wherein the memory controller is configured to increase a ratio of the capacity for providing the host data to the capacity for providing the host data and a capacity for providing the garbage collection data.

7. The memory storage device of claim 1, wherein the memory controller is configured to store meta data that includes information about the write data, and
wherein the meta data is configured to include the valid page count of the first memory block in which the write data is stored and the free block count of the memory blocks.

8. The memory storage device of claim 1, wherein the non-volatile memory is configured to program the write data in the memory blocks in response to receiving the host data, and is configured to generate a free block in response to receiving the garbage collection data.

9. A memory storage device comprising:
a non-volatile memory including a plurality of memory blocks; and
a memory controller including a memory interface connected to the non-volatile memory,
wherein the memory controller is configured to provide host data including write data to the memory interface,
wherein the memory controller is configured to provide garbage collection data to the memory interface when a free block count of the memory blocks is less than a first threshold value,
wherein the memory interface is configured to provide one or both of the host data and the garbage collection data to the non-volatile memory,
wherein the memory interface is configured not to control a ratio of a capacity for providing the host data to a capacity for providing the garbage collection data when a valid page count of a first memory block among the memory blocks is less than a third threshold value, and
wherein the memory interface is configured to control the ratio of the capacity for providing the host data to the capacity for providing the garbage collection data when the valid page count of the first memory block among the memory blocks is equal to or greater than the third threshold value.

10. The memory storage device of claim 9, wherein the memory controller is configured to control the ratio of the capacity for providing the host data to the capacity for providing the garbage collection data when the free block count of the memory blocks is equal to or less than a second threshold value less than the first threshold value.

11. The memory storage device of claim 10, wherein the memory controller is configured to control the ratio of the capacity for providing the host data to the capacity for providing the garbage collection data when the free block count of the memory blocks is greater than the second threshold value, and the valid page count of the first memory block is equal to or greater than the third threshold value.

12. The memory storage device of claim 9, wherein control of the ratio of the capacity for providing the host data to the capacity for providing the garbage collection data includes control of a decrease of the capacity for providing the host data and control of an increase of the capacity for providing the garbage collection data.

13. The memory storage device of claim 9, wherein the memory controller is configured to increase the capacity for providing the host data and decrease the capacity for providing the garbage collection data when the ratio of the capacity for providing the host data to the capacity for providing the garbage collection data is not controlled.

14. The memory storage device of claim 9, wherein a processing capacity of the memory interface corresponds to a sum of the capacity for providing the host data and the capacity for providing the garbage collection data.

15. The memory storage device of claim 9, wherein the memory controller is configured to store meta data that includes information about the write data, and
wherein the meta data is configured to include a valid page count of the memory block in which the write data is stored and the free block count of the memory blocks.

16. The memory storage device of claim 9, wherein the non-volatile memory is configured to program the write data in the memory blocks in response to receiving the host data, and is configured to generate a free block in response to the garbage collection data.

17. An electronic device comprising:
a non-volatile memory including a plurality of memory blocks;
a memory controller configured to control the non-volatile memory; and
a host connected to the memory controller,
wherein the host is configured to provide host data to the non-volatile memory,
wherein the memory controller is configured to perform a garbage collection operation on the memory blocks to provide garbage collection data to the non-volatile memory when a free block count of the memory blocks is less than a first threshold value,
wherein the memory controller is configured to increase a capacity for providing the host data, and is configured to decrease a capacity for providing the garbage collection data when the free block count of the memory blocks is greater than a second threshold value less than the first threshold value, and a valid page count of a first memory block among the memory blocks is less than a third threshold value, and
wherein the memory controller is configured to decrease the capacity for providing the host data and is configured to increase the capacity for providing the garbage collection data when a valid page count of a second memory block different from the first memory block among the memory blocks is equal to or greater than the third threshold value.

18. The electronic device of claim 17, wherein the memory controller is configured to decrease the capacity for providing the host data, and is configured to increase the capacity for providing the garbage collection data when the free block count of the memory blocks is equal to or less than the second threshold value.

19. The electronic device of claim 17, wherein the memory controller is configured not to perform the garbage collection operation on the memory blocks and not to provide the garbage collection data to the non-volatile memory when the free block count of the memory blocks is equal to or greater than the first threshold value.

20. The electronic device of claim 17 wherein the memory controller is configured to increase a ratio of the capacity for providing the host data to the capacity for providing the host data and a capacity for providing the garbage collection data.

* * * * *